(12) United States Patent  (10) Patent No.: US 7,575,290 B2
King et al.  (45) Date of Patent: Aug. 18, 2009

(54) MOTOR VEHICLE ENTERTAINMENT UNIT WITH A PRINTER

(75) Inventors: Tobin Allen King, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

(21) Appl. No.: 12/030,823

(22) Filed: Feb. 13, 2008

(65) Prior Publication Data

US 2008/0129767 A1 Jun. 5, 2008

Related U.S. Application Data

(63) Continuation of application No. 10/503,885, filed as application No. PCT/AU03/00164 on Feb. 12, 2003, now Pat. No. 7,354,121.

(30) Foreign Application Priority Data

Feb. 13, 2002 (AU) ................................ PS0476

(51) Int. Cl.
B41J 3/00 (2006.01)
B41J 29/38 (2006.01)
(52) U.S. Cl. ............................... 347/2; 347/13
(58) Field of Classification Search ............ 347/2, 347/13, 42, 85–86
See application file for complete search history.

(56) References Cited

U.S. PATENT DOCUMENTS 4,919,477 A * 4/1990 Bingham et al. ......... 296/24.36
5,124,800 A 6/1992 Hashimoto
6,149,256 A 11/2000 McIntyre et al.
6,229,558 B1 * 5/2001 Saigo et al. ................. 347/232
6,230,138 B1 5/2001 Everhart
6,262,764 B1 7/2001 Perterson
6,273,310 B1 8/2001 Gregory
6,445,936 B1 9/2002 Fujiwara
2001/0001346 A1 5/2001 Carter et al.
2002/0024569 A1 * 2/2002 Silverbrook ................. 347/85
2002/0063742 A1 5/2002 Nojima et al.
2003/0189615 A1 10/2003 Lapstun et al.

FOREIGN PATENT DOCUMENTS

DE 3930427 3/1991
DE 19754224 A 6/1999
DE 19907003 A 8/2000
JP 06-164872 A 6/1994
JP 11007471 A 1/1999
JP 2001-212978 8/2001
JP 2001-310459 11/2001
JP 2001-328309 11/2001
JP 2001-328312 A 11/2001
RU 2086946 C 8/1997
WO WO 95/22123 8/1995
WO WO 99/50088 A 10/1999

* cited by examiner

Primary Examiner—Julian D Huffman
Assistant Examiner—Jason S Uhlenhake

(57) ABSTRACT

The invention relates to an in-car entertainment unit for operative mounting in a cockpit of a motor vehicle. The unit includes a printer having a pagewidth printhead, an ink and media cartridge, and a feed system for feeding the media past the printhead. The unit also includes a slot with electrical contacts for operatively receiving a digital camera so that information is downloadable from the camera for printing via the printer, and a display for previewing the information prior to printing.

6 Claims, 24 Drawing Sheets

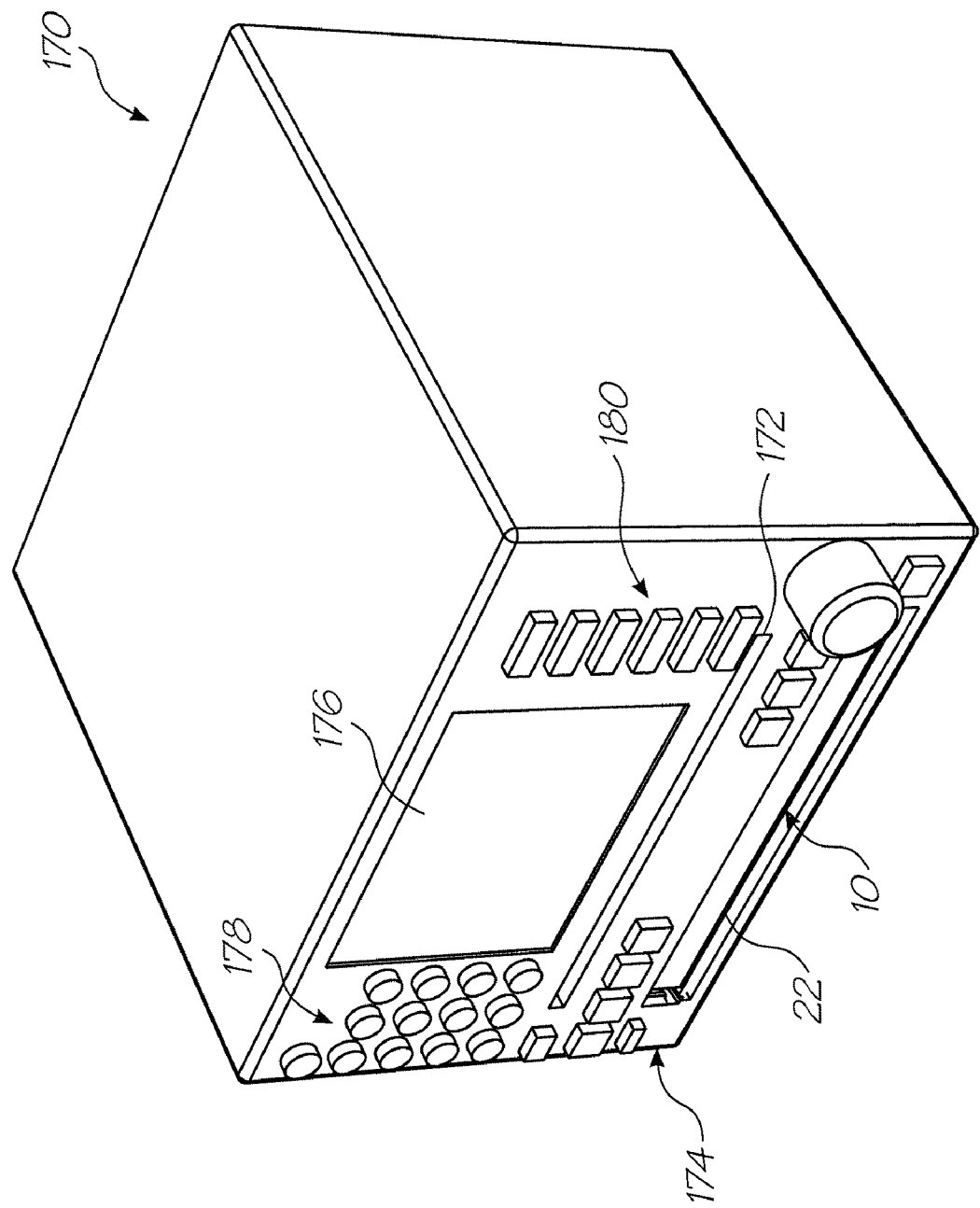

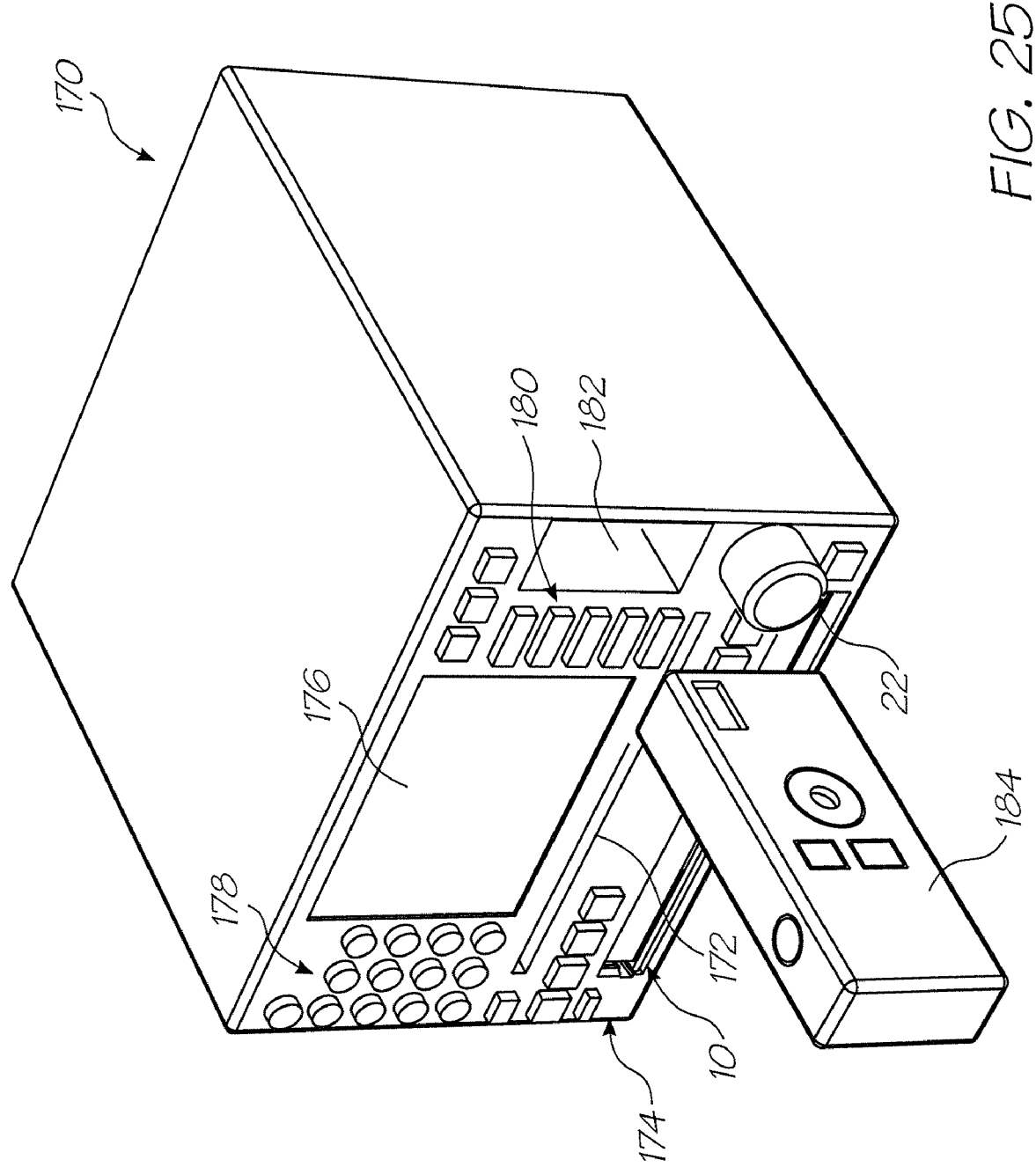

MOTOR VEHICLE ENTERTAINMENT UNIT WITH A PRINTER

CROSS REFERENCES TO RELATED APPLICATIONS

The present application continuation application of U.S. patent application Ser. No. 10/503,885 filed on Aug. 9, 2004, which is a 371 of PCT/AU03/00164 filed on Feb. 12, 2003, all of which are herein incorporated by reference.

FIELD OF INVENTION

The present invention relates to a printer for a conveyance and to a conveyance including such printer.

In this specification, unless the context clearly indicates otherwise, the term "conveyance" is to be understood in a broad sense as any form of device which conveys persons and/or goods and includes, but is not necessarily limited to, road vehicles, rail vehicles, aircraft, spacecraft and waterborne craft.

BACKGROUND TO THE INVENTION

These days, more and more information is provided to people. The information is made available in various forms, including audible forms and visual forms. Often, the information is made available to persons in a conveyance.

There are situations where it is desirable to have a record of such information. To date, making a record of such information means that the person needs some means to record the information, for example, on a magnetic recording medium by way of a dictation machine or by making written notes on paper. Often such recording devices are not readily to hand and vital information can be lost.

CO-PENDING APPLICATIONS

Various methods, systems and apparatus relating to the present invention are disclosed in the following co-pending applications filed by the applicant or assignee of the present invention simultaneously with the present application:

| | | | | |
|---|---|---|---|---|
| PCT/AU03/00154 | PCT/AU03/00151 | PCT/AU03/00150 | PCT/AU03/00145 | PCT/AU03/00153 |
| PCT/AU03/00152 | PCT/AU03/00168 | PCT/AU03/00169 | PCT/AU03/00170 | PCT/AU03/00162 |
| PCT/AU03/00146 | PCT/AU03/00159 | PCT/AU03/00171 | PCT/AU03/00149 | PCT/AU03/00167 |
| PCT/AU03/00158 | PCT/AU03/00147 | PCT/AU03/00166 | PCT/AU03/00164 | PCT/AU03/00163 |
| PCT/AU03/00165 | PCT/AU03/00160 | PCT/AU03/00157 | PCT/AU03/00148 | PCT/AU03/00156 |
| PCT/AU03/00155 | | | | |

The disclosures of these co-pending applications are incorporated herein by cross-reference.

RELATED PATENT APPLICATIONS AND PATENTS

| | | | | |
|---|---|---|---|---|
| 6566858 | 6331946 | 6246970 | 6442525 | PCT/AU01/00141 |
| 09/505951 | PCT/AU01/00139 | 6816968 | 6757832 | PCT/AU01/00140 |
| PCT/AU00/00741 | 6238044 | PCT/AU00/00742 | 6425661 | 6227652 |
| 6213588 | 6213589 | 6231163 | 6247795 | 6394581 |
| 6244691 | 6257704 | 6416168 | 6220694 | 6257705 |
| 6247794 | 6234610 | 6247793 | 6264306 | 6241342 |
| 6247792 | 6264307 | 6254220 | 6234611 | 6302528 |
| 6283582 | 6239821 | 6338547 | 6247796 | 6557977 |
| 6390603 | 6362843 | 6293653 | 6312107 | 6227653 |
| 6234609 | 6238040 | 6188415 | 6227654 | 6209989 |
| 6247791 | 6336710 | 6217153 | 6416167 | 6243113 |
| 6283581 | 6247790 | 6260953 | 6267469 | 6273544 |
| 6309048 | 6420196 | 6443558 | 6439689 | 6378989 |
| 6848181 | 6634735 | PCT/AU98/00550 | PCT/AU00/00095 | 6390605 |
| 6322195 | 6612110 | 6480089 | 6460778 | 6305788 |
| PCT/AU00/00172 | 6426014 | PCT/AU00/00338 | 6364453 | PCT/AU00/00339 |
| 6457795 | PCT/AU00/00581 | 6315399 | PCT/AU00/00580 | 6338548 |
| PCT/AU00/00582 | 6540319 | PCT/AU00/00587 | 6328431 | PCT/AU00/00588 |
| 6328425 | PCT/AU00/00589 | 6991320 | PCT/AU00/00341 | 6595624 |
| PCT/AU00/00340 | PCT/AU00/00749 | 6417757 | PCT/AU01/01332 | 7095309 |
| PCT/AU01/01318 | 6854825 | PCT/AU00/00750 | 7075677 | PCT/AU00/00751 |
| 6428139 | PCT/AU00/00752 | 6575549 | PCT/AU01/00502 | PCT/AU00/00583 |
| 6383833 | PCT/AU02/01120 | PCT/AU00/00593 | 6464332 | PCT/AU00/00333 |
| PCT/AU00/01513 | 6428142 | PCT/AU00/00590 | 6390591 | PCT/AU00/00591 |
| 7018016 | PCT/AU00/00592 | 6328417 | PCT/AU00/00584 | 6322194 |
| PCT/AU00/00585 | 6382779 | PCT/AU00/00586 | 6629745 | PCT/AU00/01514 |
| 6565193 | PCT/AU00/01515 | 6609786 | PCT/AU00/01516 | 6609787 |
| PCT/AU00/01517 | 6439908 | PCT/AU00/01512 | 6684503 | PCT/AU00/00753 |
| 6755513 | PCT/AU00/00594 | 6409323 | PCT/AU00/00595 | 6281912 |
| PCT/AU00/00596 | 6604810 | PCT/AU00/00597 | 6318920 | PCT/AU00/00598 |
| 6488422 | PCT/AU01/01321 | 6655786 | PCT/AU01/01322 | 6457810 |
| PCT/AU01/01323 | 6485135 | PCT/AU00/00516 | 6795215 | PCT/AU00/00517 |
| 09/575109 | PCT/AU00/00511 | 6859289 | PCT/AU00/00754 | 6977751 |
| PCT/AU00/00755 | 6398332 | PCT/AU00/00756 | 6394573 | PCT/AU00/00757 |
| 6622923 | | | | |

SUMMARY OF THE INVENTION

According to the invention, there is provided a conveyance (as defined above), including:
a zone for receiving at least one of goods and persons; and
at least one printer incorporated into a fitting in said zone.

The conveyance may take the form of a vehicle. The zone may thus be a passenger compartment or zone of the vehicle. It is to be understood that a "passenger zone" includes a region of the conveyance in which a person controlling the conveyance is located such as an appropriate area of a motor cycle, a cockpit of an aircraft, a cabin of a rail vehicle or boat, or the like. In particular, the conveyance may be a motor vehicle and the passenger compartment may be a cockpit of the motor vehicle.

The fitting of said zone may be selected from the group comprising a dashboard, a console, a central arm rest, a door arm rest, a glove box, a glove box lid, a parcel shelf, a storage compartment and an overhead fitting. Those skilled in the art will, however, appreciate that any other suitable location in the passenger compartment could be employed to mount the printer such as footwells of the passenger compartment, a back rest of a front seat of the vehicle, including headrests thereof, a rear arm rest, a rear parcel shelf, or the like.

The overhead console may be mounted above a rear view mirror mounted in the passenger compartment.

The printer may be a full color printer. More particularly, the printer may be a photo quality color printer.

In particular, the printer may be an inkjet printer. Thus, the printer may comprise a pagewidth inkjet printhead. The printhead may comprise an inkjet nozzle array, the array being fabricated by microelectromechanical techniques.

BRIEF DESCRIPTION OF THE DRAWINGS

A preferred and exemplary embodiment of the invention will now described with reference to the accompanying drawings, in which:—

FIG. 24 shows a three dimensional view of yet a further vehicle audio unit incorporating the printer; and FIG. 25 shows a three-dimensional view of still a further vehicle audio unit incorporating a printer and other devices.

DETAILED DESCRIPTION OF PREFERRED EMBODIMENT

Figure 1:
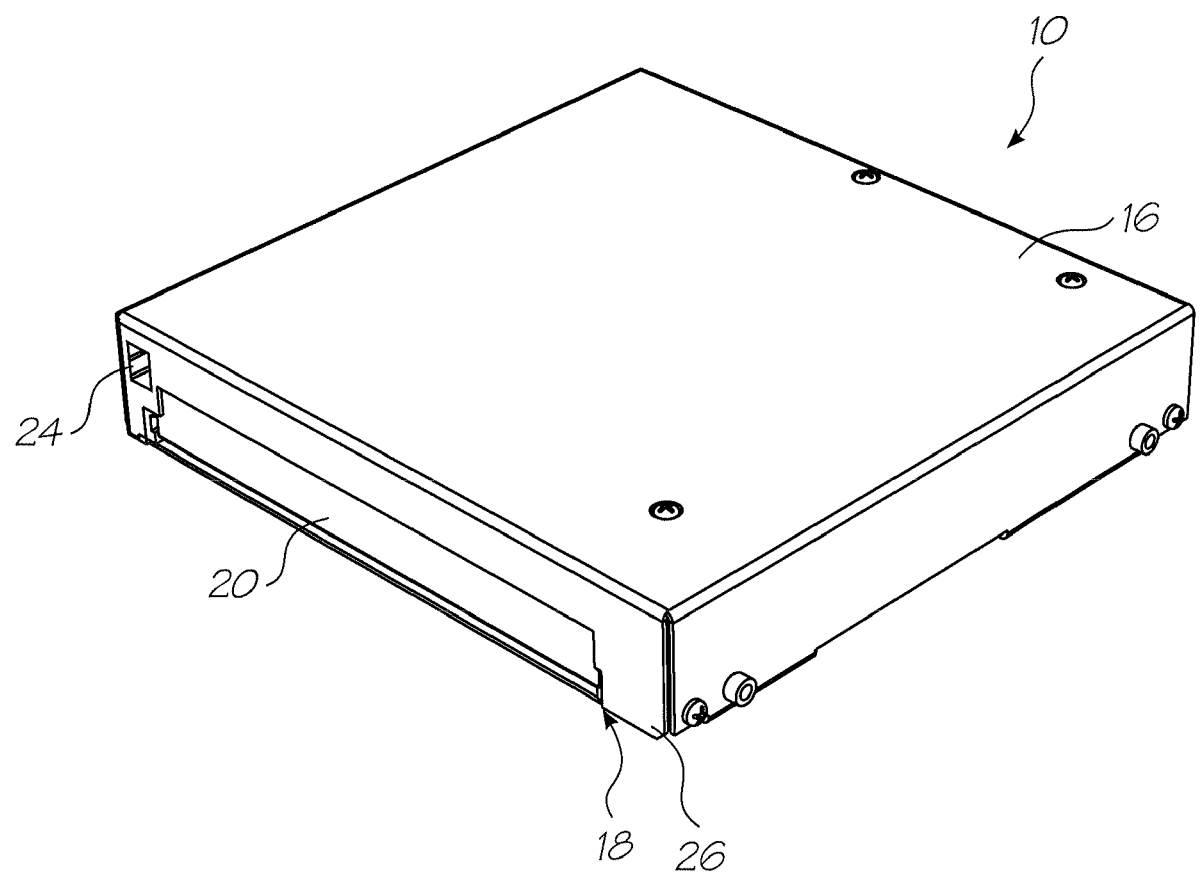
FIG. 1 shows a three dimensional, front view of a printer, in accordance with the invention, for a conveyance.

Referring to the drawings, reference numeral 10 generally designates a printer, in accordance with the invention, for a conveyance, as defined. The printer 10 is intended for use in any suitable type of conveyance of the type described. However, for ease of reference, the printer 10 will be described with reference to its application in a motor vehicle.

The printer 10 includes a chassis 12 (FIG. 4) covered by a top cover 16 that has an access opening 18 closed off by a flap 20. The flap 20 is spring biased so that, when a cartridge 22 has been removed from the printer 10, the flap is urged to the position shown in FIG. 1 of the drawings.

It is important to note that the printer 10 does not have any of its own controls and, effectively, is a dumb unit. The unit is therefore actuated from a device from which it is desired to print material.

The device that sends commands to the printer 10 can either be hard wired to the printer 10, for example, via a wiring loom of the motor vehicle or, instead, the device may send commands to the printer 10 in a wireless manner. For this purpose, the printer 10 includes a port 24 able to detect wireless communications of some form.

Various forms of wireless communications can be employed such as an infra red communication system, a personal area network (PAN) system referred to as Bluetooth, a radio local area network (LAN) or a digital cordless telephone system.

Further, the device which communicates with the printer 10 can be of various forms such as, for example, a palm computer, a laptop computer, a mobile telephone, a digital camera, a scanner, a diagnostics system for the motor vehicle, a navigation system, a vehicle entertainment system, or the like. This is not intended to be an exhaustive list and those skilled in the art will readily conceive of other devices that can communicate with the printer 10.

Figure 2:
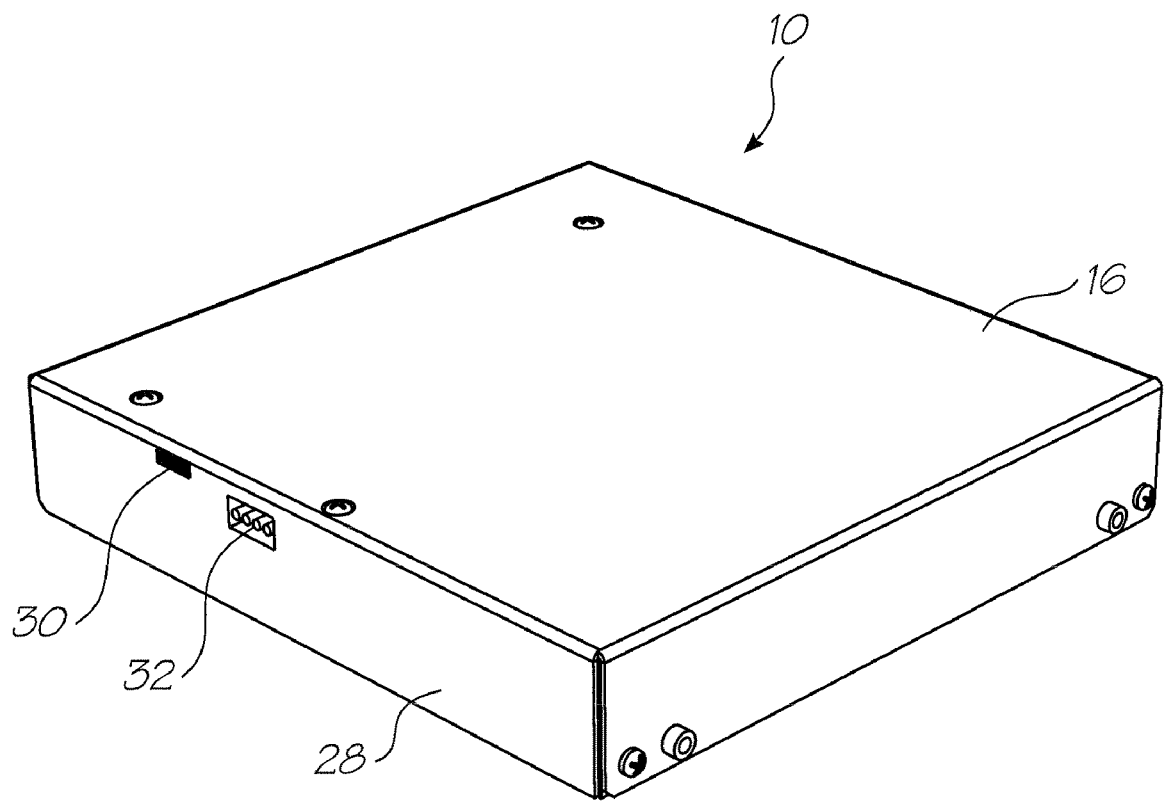
FIG. 2 shows a three dimensional, rear view of the printer.
Figure 3:
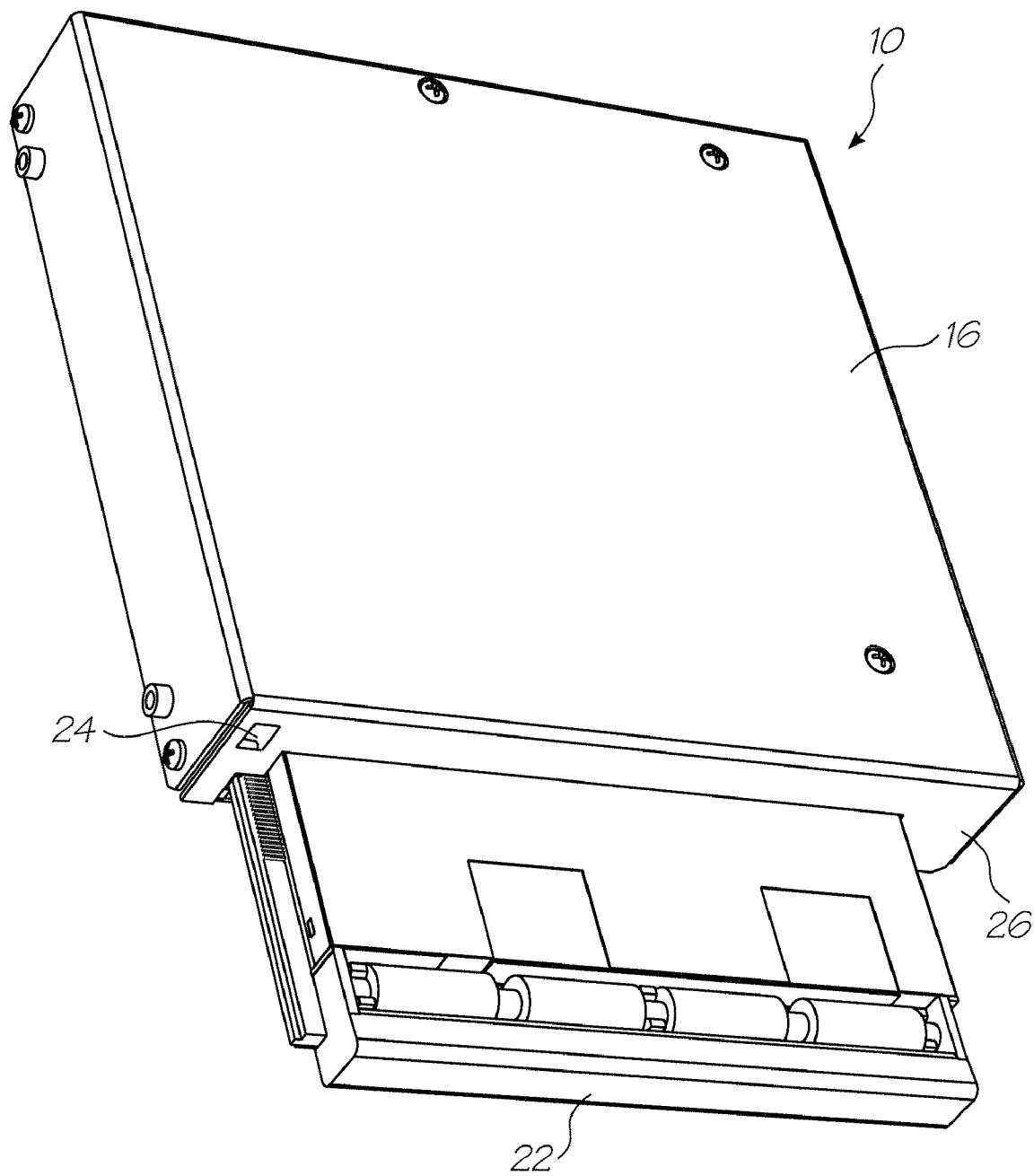
FIG. 3 shows a three dimensional, front view of the printer illustrating cartridge insertion or removal.

The port 24 is mounted on a front face 26 of the printer 10. As shown in greater detail in FIG. 2 of the drawings, a rear face 28 of the printer 10 accommodates a data socket 30 and a power socket 32. It will be appreciated that, when the printer 10 communicates exclusively in a wireless manner, the data socket 30 may be omitted.

Figure 4:
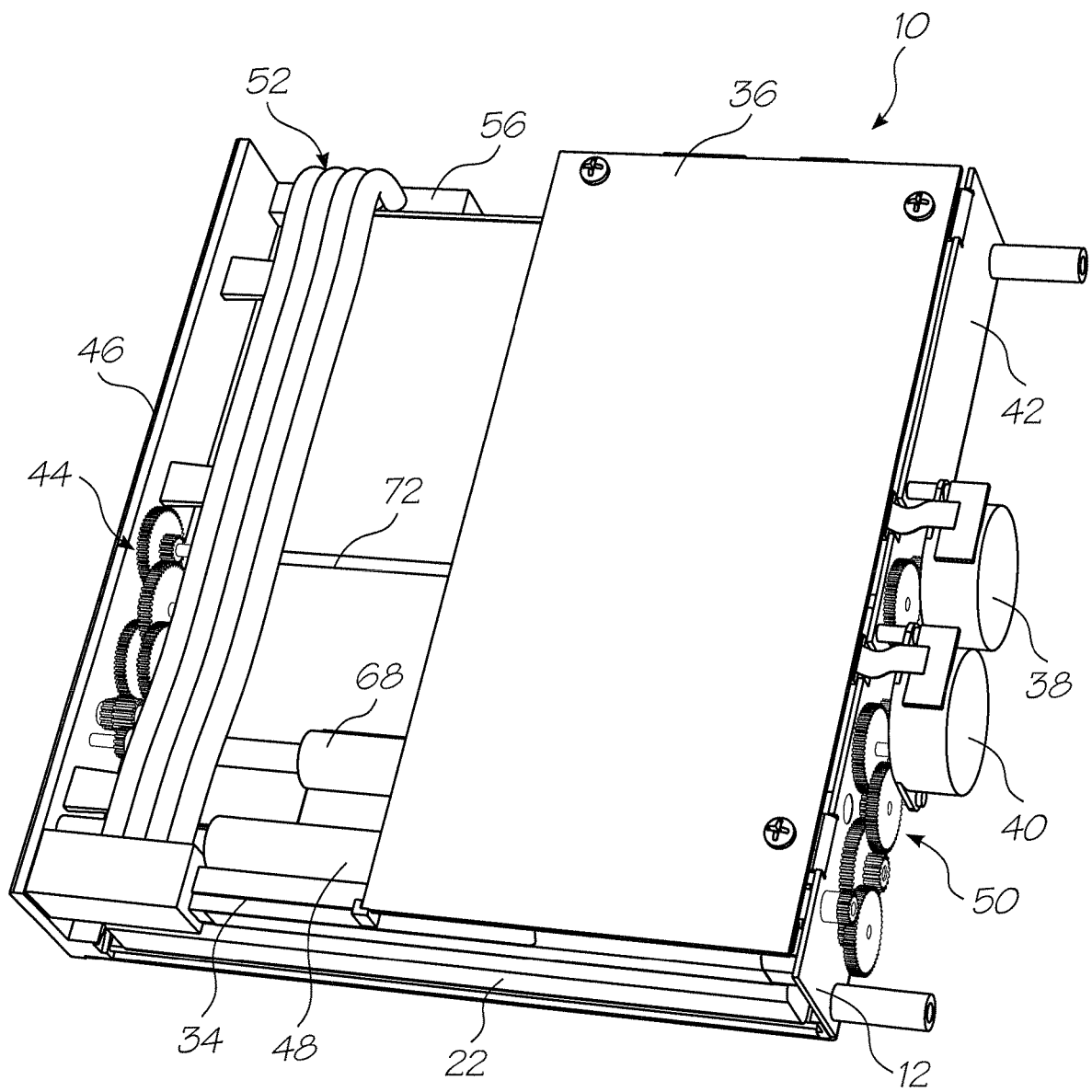
FIG. 4 shows a three dimensional view of the printer with a top cover removed.

The printer 10 incorporates a printhead 34 (FIG. 4). The printhead 34 is a pagewidth inkjet printhead. More particularly, the printhead 34 is a four color printhead, or three color plus infrared ink, printhead that prints photo quality prints on print media stored in the cartridge 22. The printhead 34 comprises an array of nozzles to provide printing at 1600 dpi. The nozzles of the printhead 34 are manufactured using the applicant's Memjet technology.

The printhead 34 receives commands from a printed circuit board (PCB) 36 secured to the chassis 12.

A pair of drive motors 38 and 40 is mounted on a sidewall 42 of the chassis 12. The drive motor 38, which is in the form of a stepper motor, drives a first drive arrangement in the form of a first gear train 44. The first gear train 44 is mounted on a side molding 46 of the chassis 12.

The drive motor 40, which is also in the form of a stepper motor, drives a drive roller 48 via a second drive arrangement. The second drive arrangement comprises a second gear train 50.

Figure 13:
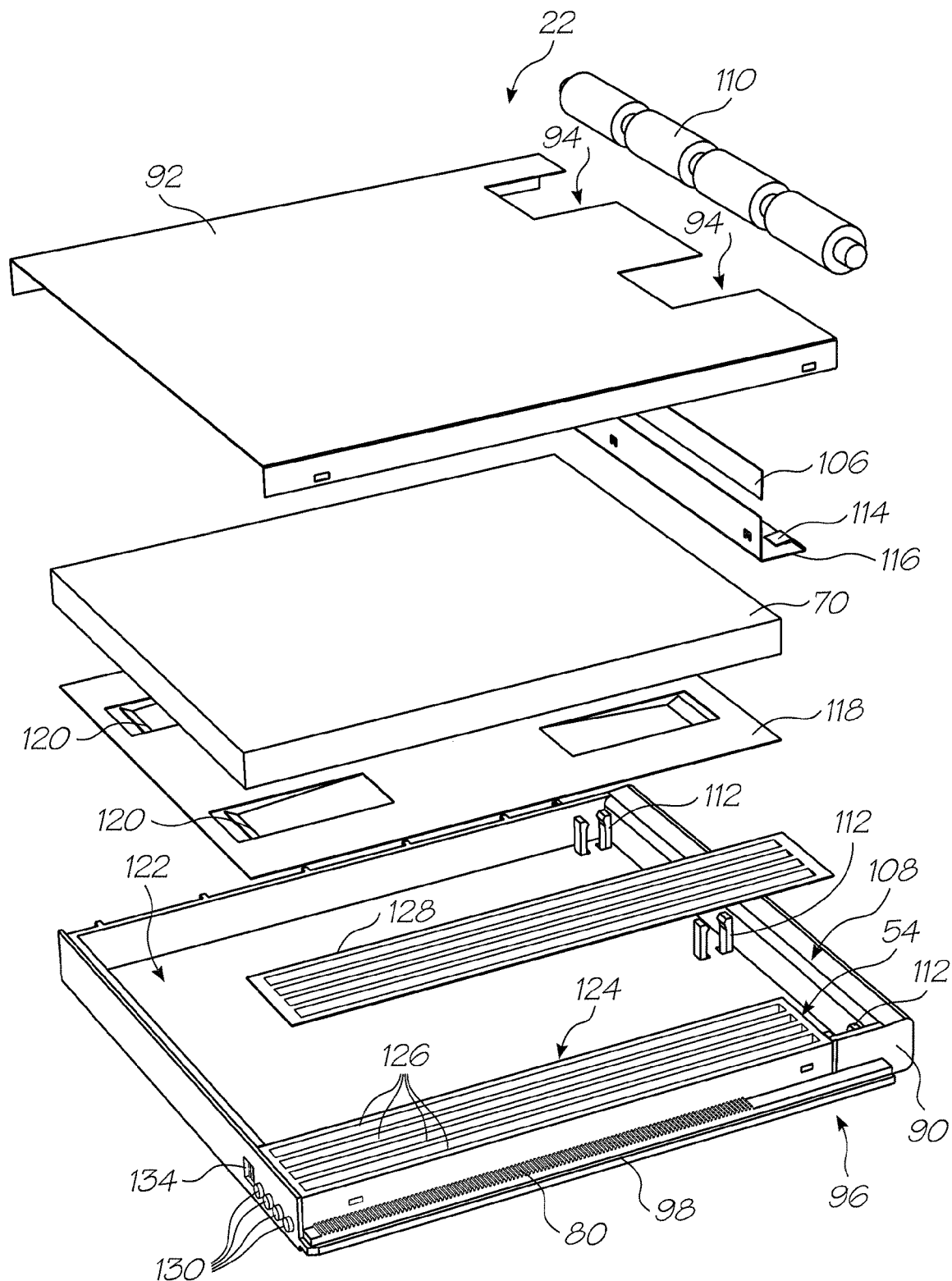
FIG. 13 shows a three dimensional, exploded view of the cartridge.
Figure 14:
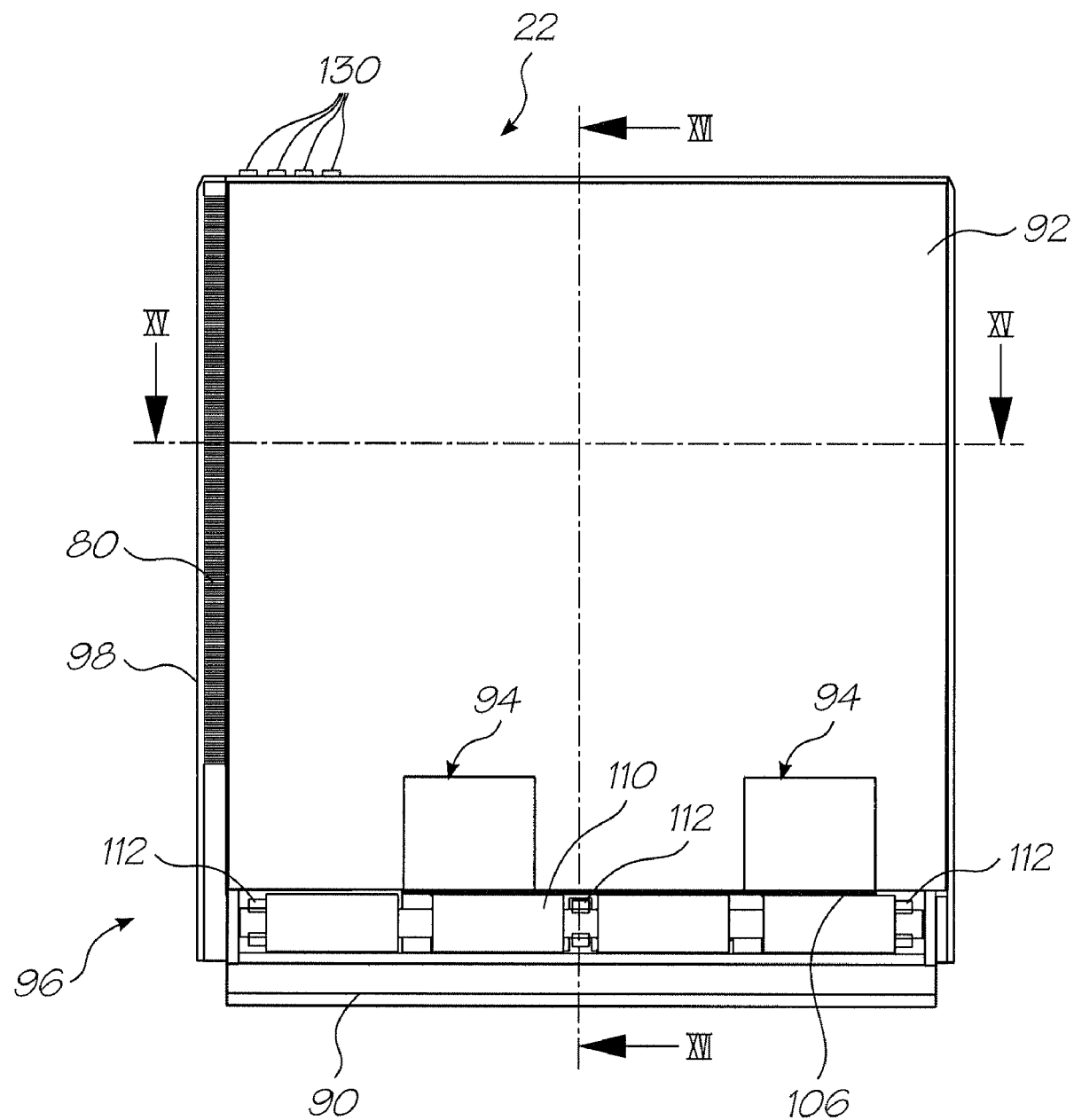
FIG. 14 shows a plan view of the cartridge.
Figure 15:
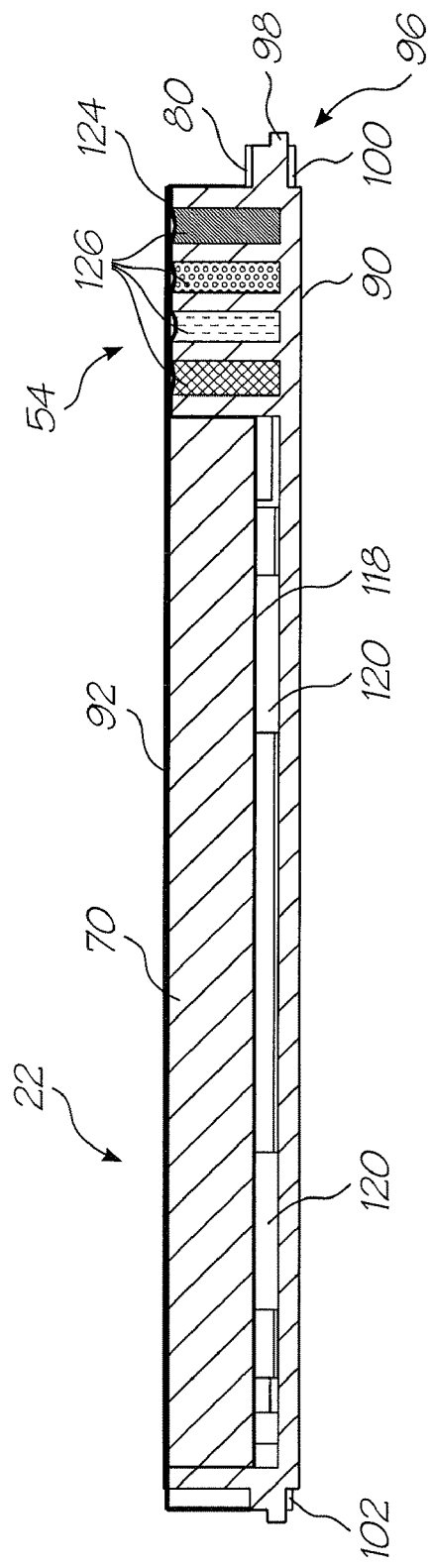
FIG. 15 shows a sectional, end view taken along line XV-XV in FIG. 14.
Figure 16:
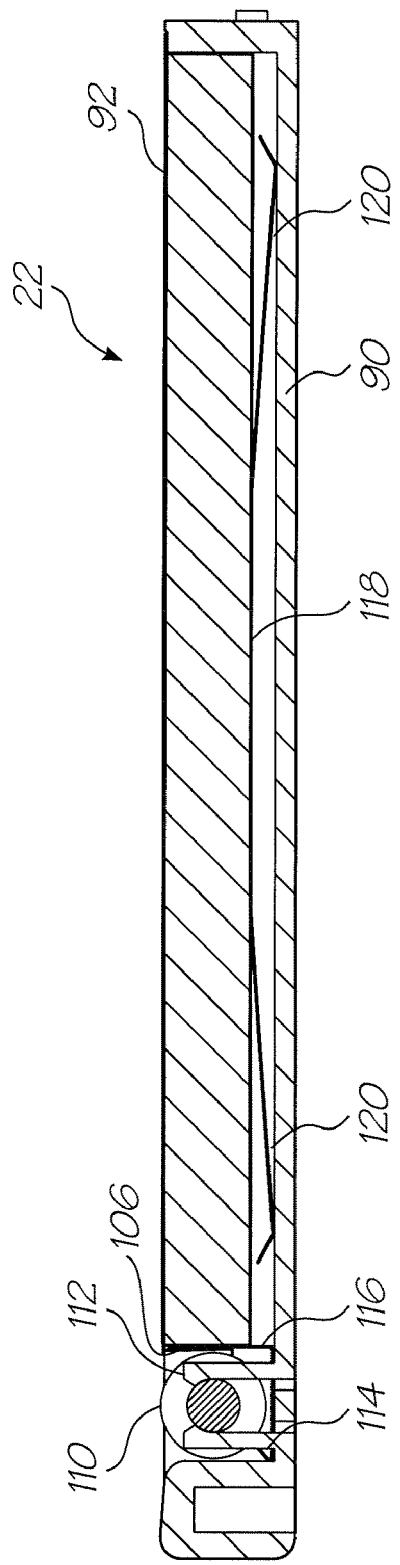
FIG. 16 shows a sectional, side view of the cartridge taken along line XVI-XVI in FIG. 14.

The printhead 34 receives ink from ink hoses 52 that communicate with an ink supply reservoir 54 (FIGS. 13 and 15) of the cartridge 22 via an ink supply manifold 56, as will be described in greater detail below.

Figure 5:
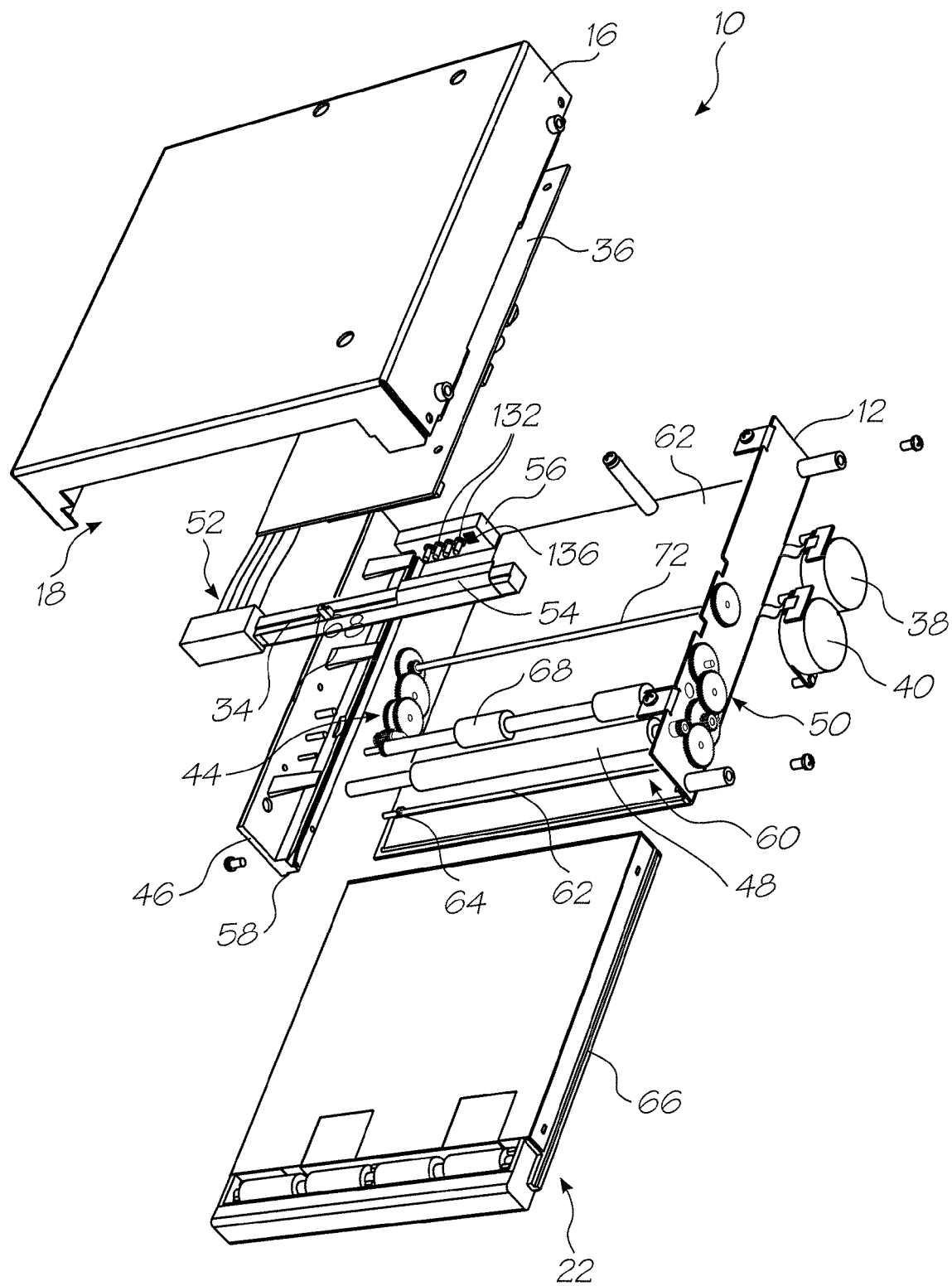
FIG. 5 shows a three dimensional, exploded view of the printer.
Figure 6:
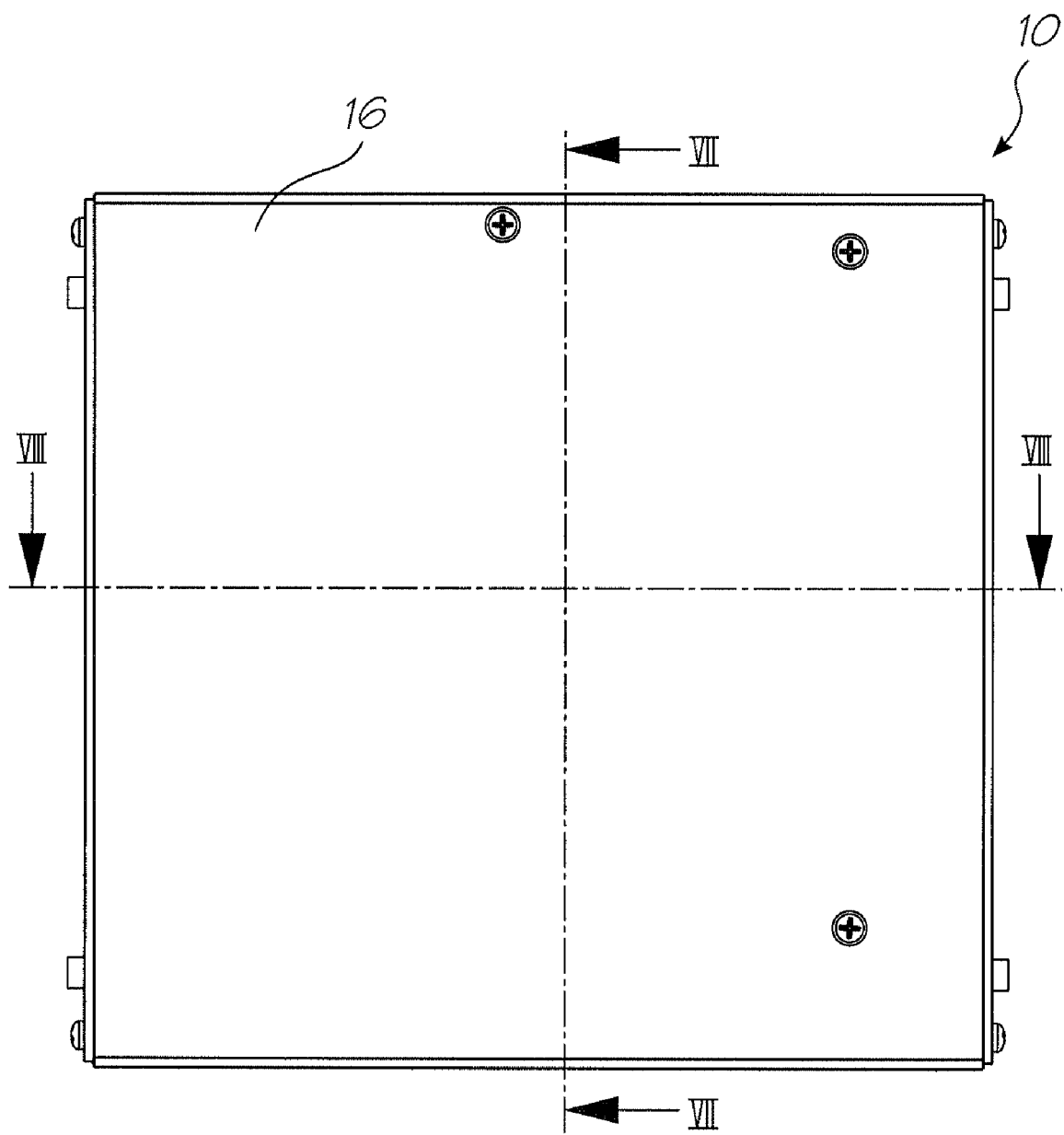
FIG. 6 shows a plan view of the printer.
Figure 7:
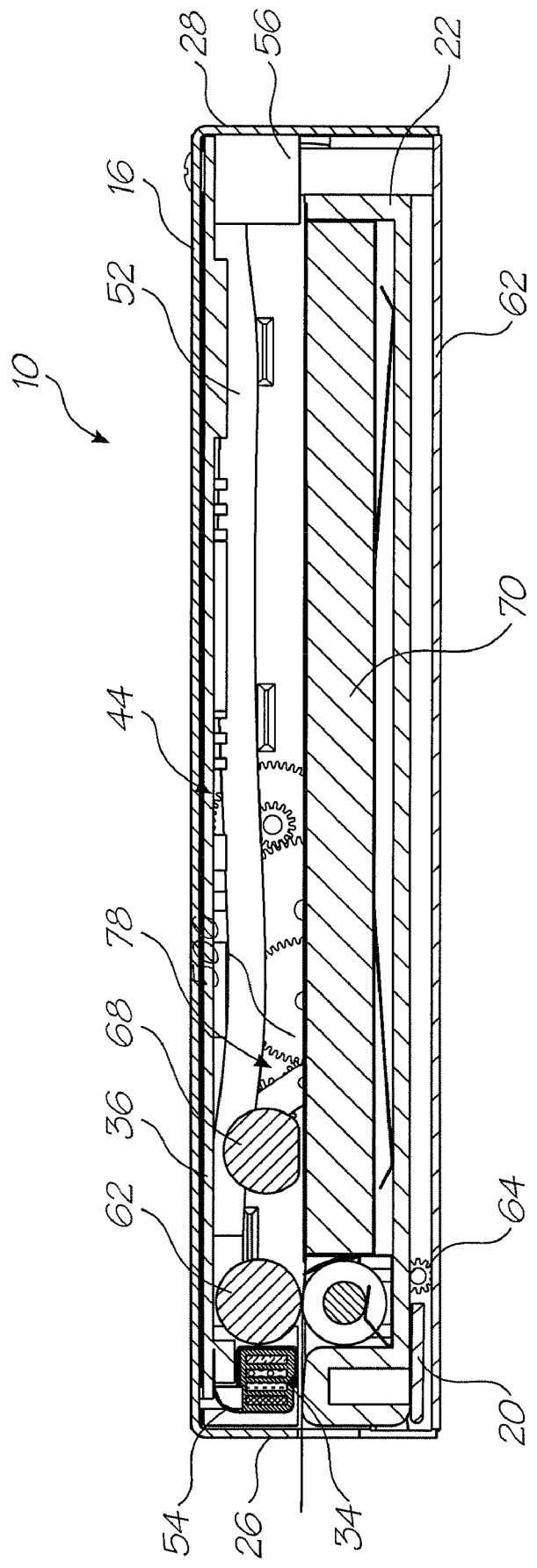
FIG. 7 shows a sectional, side view of the printer taken along line VII-VII in FIG. 6.
Figure 8:
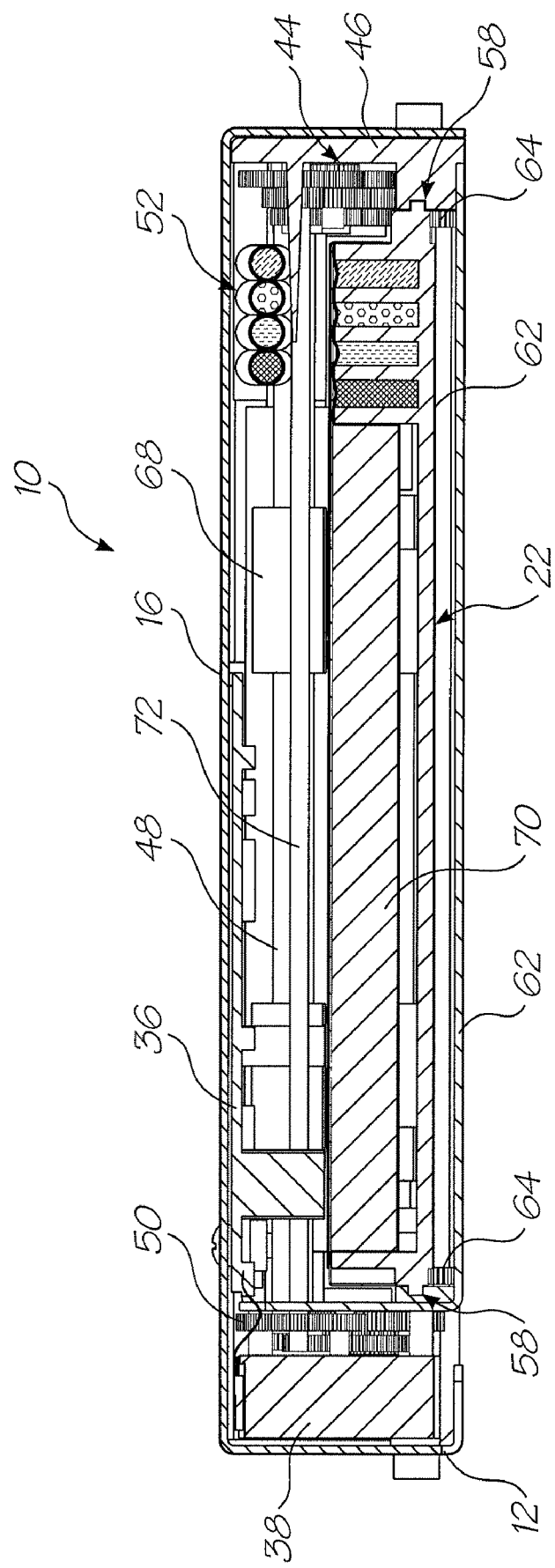
FIG. 8 shows a sectional, end view of the printer taken along line VIII-VIII in FIG. 6.

Referring to FIG. 5 of the drawings, an exploded view of the printer 10 is illustrated. It is to be noted that the printhead 34 communicates with the PCB 36 via a TAB film 54.

Figure 12:
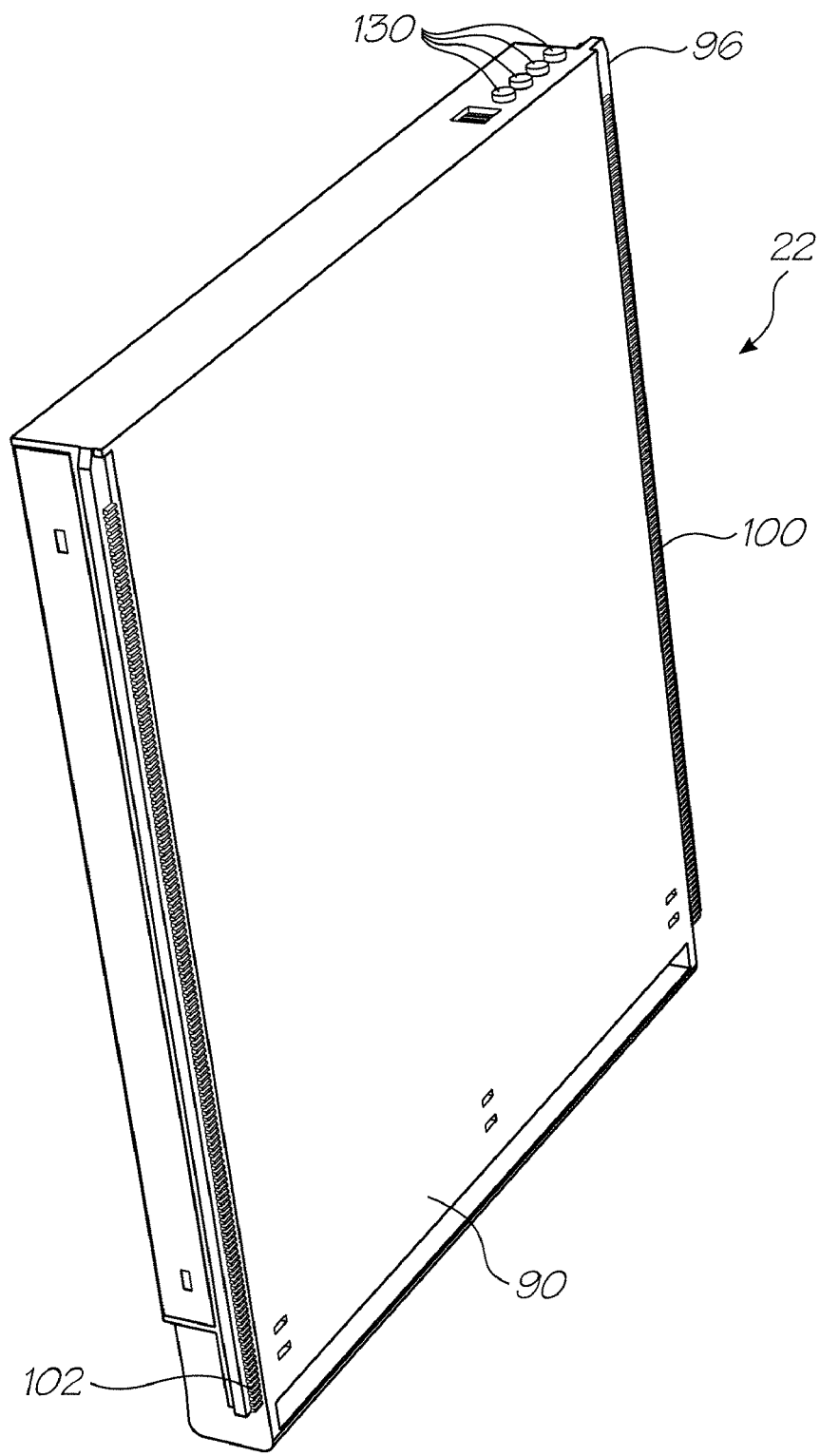
FIG. 12 shows a three dimensional, bottom view of the cartridge.

A slot 58 is defined in the side molding 46. The slot 58 receives a corresponding formation of the cartridge 22 in it. Further, a roller set 60 is mounted on a base 62 of the printer 10. The roller set 60 comprises a rotatable axle 62. A cog 64 is mounted proximate each end of the axle 62. Each cog 64 engages a rack 100, 102 (FIG. 12) on the cartridge 22 for inhibiting skewing of the cartridge 22 as it is inserted into, or withdrawn from, the interior of the printer 10.

The first gear train 44 engages a pick up roller 68 of the printer 10. The pick up roller 68 picks up print media in the form of a sheet of paper from a stack 70 of paper (FIG. 13) in the cartridge 22 for feeding to the printhead 34 of the printer 10 when printing is to be effected.

Figure 9:
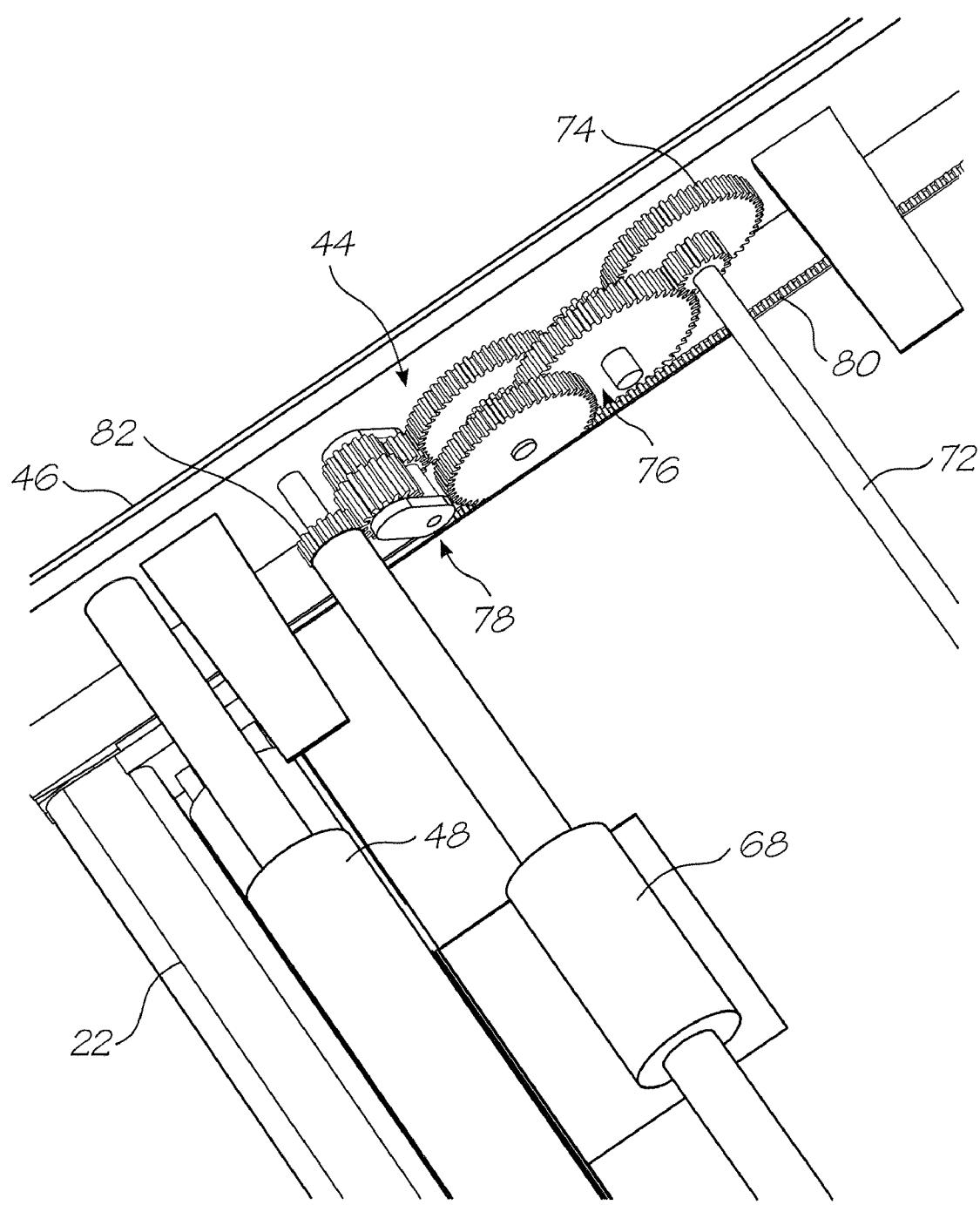
FIG. 9 shows a first drive arrangement of the printer.
Figure 10:
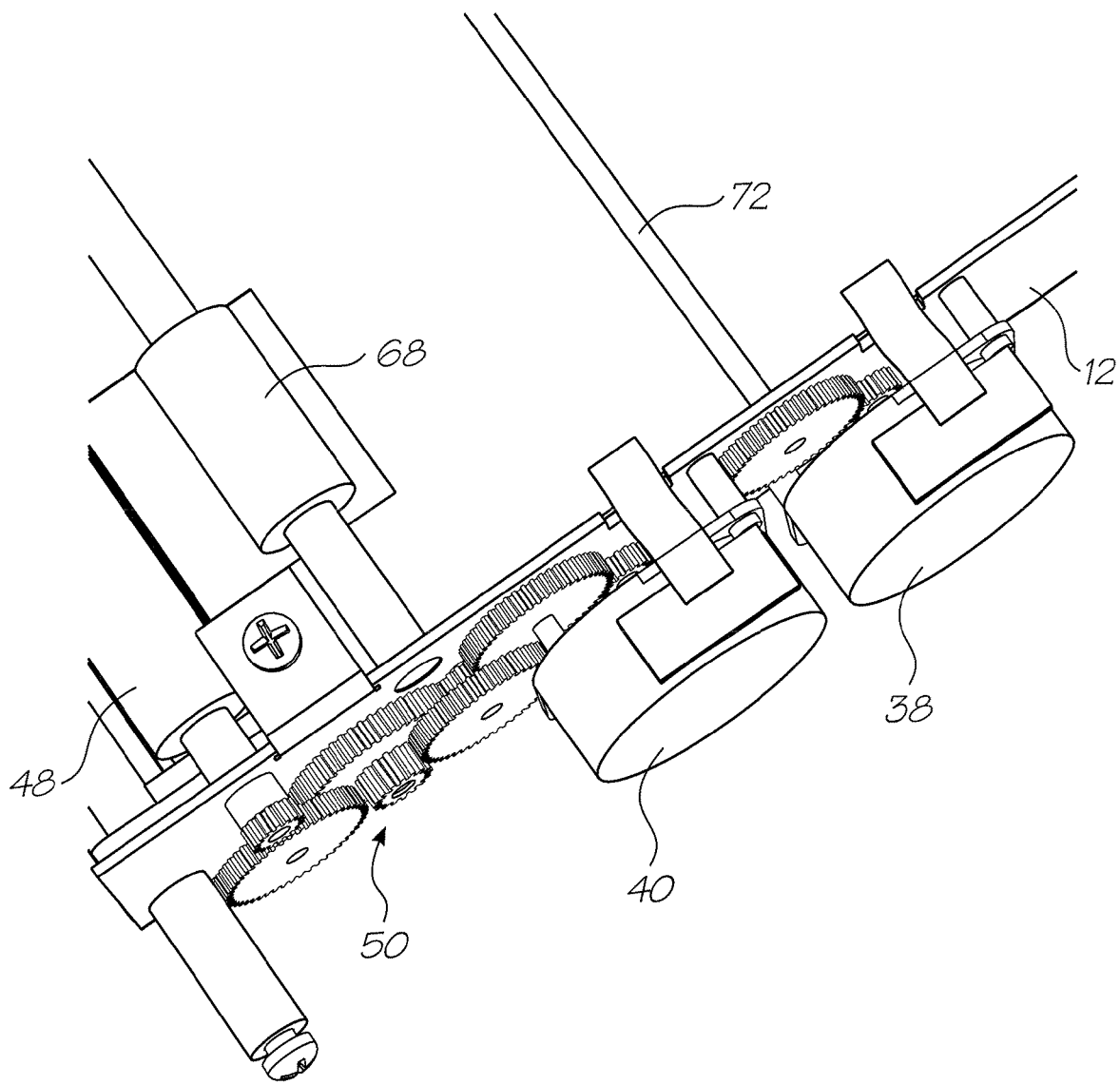
FIG. 10 shows a second drive arrangement of the printer.
Figure 11:
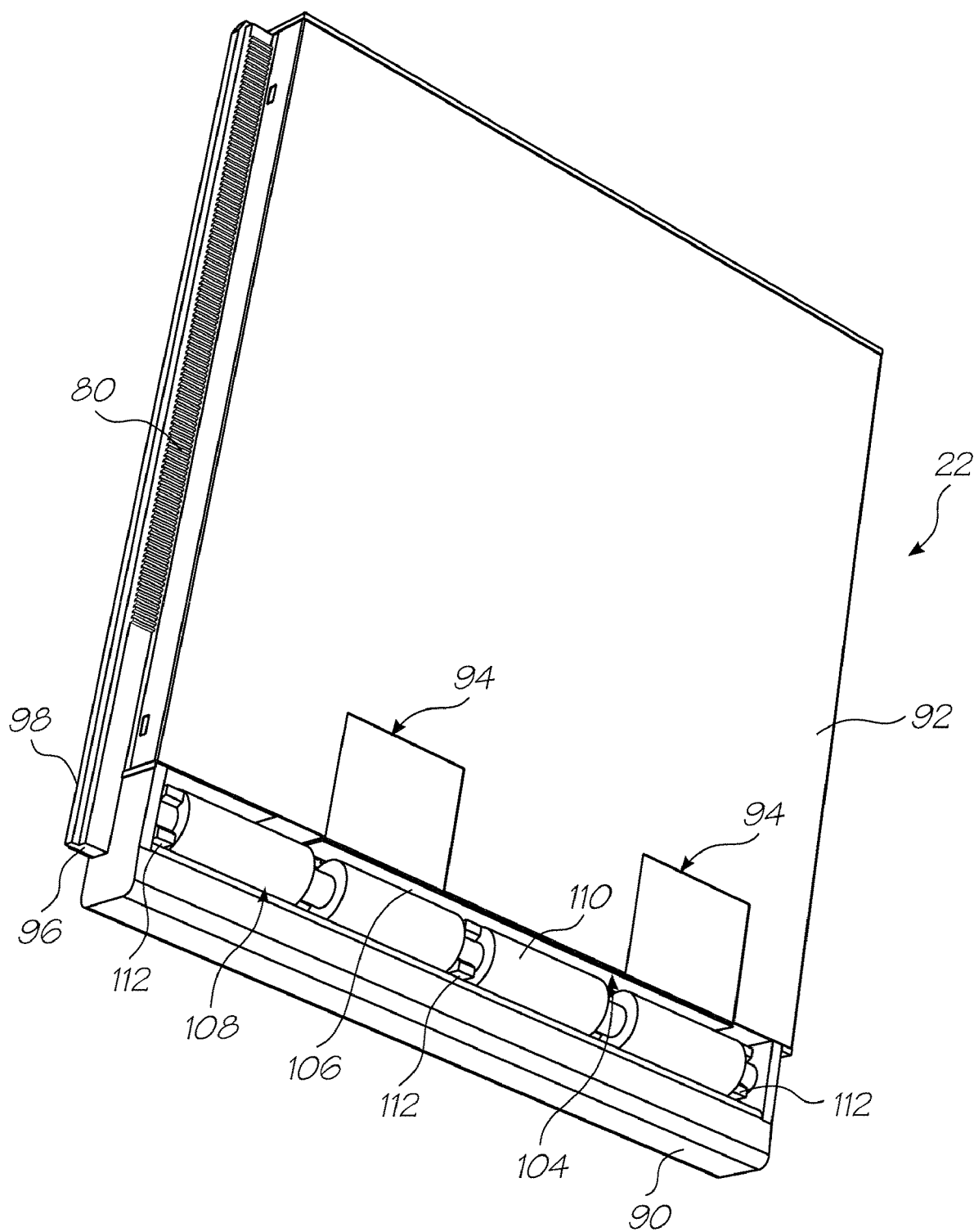
FIG. 11 shows a three dimensional, top view of an ink cartridge for the printer.

As shown in greater detail in FIG. 9 of the drawings, the first gear train 44 is powered by the stepper motor 38 via an axle 72 extending across the printer 10 to convey power from the stepper motor 38 to the first gear train 44. A gear 74 is mounted against the molding 46 at one end of the axle 72. The gear 74 drives a reduction gear set 76. Further, the reduction gear set 76 communicates with a reversing mechanism 78. Accordingly, the gear train 44 performs two functions. When the reversing mechanism 78 is not selected, the gear train 44 engages an upper rack 80 on the cartridge 22 for feeding the cartridge 22 into the printer 10 or ejecting the cartridge 22 from the printer 10. Instead, when the reversing mechanism is in the position shown in FIG. 9 of the drawings, it engages the pick up roller 68 or, more particularly, a gear 82 mounted at an end of the pick up roller 68. The gear train 44 then serves to feed the paper to the drive roller 48 for conveying to the printhead 34.

Referring now to FIGS. 11 to 20 of the drawings, the cartridge 22 is described in greater detail.

The cartridge 22 comprises a base molding 90. The base molding 90 is closed off by a metal cover 92. The cover 92 has a pair of transversely spaced openings 94 defined in a front edge thereof. These openings 94 permit the pick up roller 68 of the printer 10 to engage a topmost sheet of the stack 70 of paper within the cartridge 22.

A toothed rack 96 is provided on one side of the cartridge 22. The toothed rack 96 defines the upper rack 80 that is engaged by a gear of the first gear train 44 for insertion of the cartridge 22 into, or its ejection from, the printer 10. A rib 98 extends longitudinally along the side of the toothed rack 96. The rib 98 is received in the slot 58 in the side molding 46 of the printer 10. A lower surface of the toothed rack 96 also has the rack 100 (FIG. 12) for engagement with one of the cogs 64. An opposed side of the base molding 90 of the cartridge 22 carries the other rack 102 that engages the other cog 64 for inhibiting skewing of the cartridge 22 when it is inserted into, or ejected from, the printer 10.

A feed slot 104 is defined at a front edge of the metal cover through which a sheet of paper to be printed is passed in use. The feed slot 104 is partially defined by a plastics strip 106, which inhibits more than one sheet of paper being fed to the printhead 34 at any one time.

A transversely extending trough 108 is defined outwardly of the strip 106. The trough 108 accommodates a sprung roller 110 therein. The roller 110 is supported in the trough 108 via a plurality of clips 112.

The roller 110 is biased upwardly relative to a base of the trough 108 via a plurality of leaf springs 114. The leaf springs 114 are formed integrally with an L-shaped metal bracket 116 that partially forms the trough 108. The roller 110 is a snap-fit in the clips 112.

A platen 118 is accommodated in the base molding 90. The platen 118 is spring biased via a plurality of leaf springs 120 which engage a floor 122 of the base molding 90 for urging the stack 70 of paper against the cover 92.

The ink supply reservoir 54 includes an ink supply molding 124 formed integrally with the base molding 90. The ink supply molding 124 defines a plurality of ink supply channels 126. Each ink supply channel 126 contains a particular color of ink. In this context, the term "color" is to be understood as including inks which are invisible in the visible spectrum such as, for example, infra red inks.

The channels 126 are closed off by a flexible bladder-like membrane 128, which is heat-sealed to the molding 124. It will be appreciated that, as ink is withdrawn from each channel 126, the associated membrane 128 collapses into the channel 126 thereby inhibiting the ingress of air into that channel 126.

Each channel 126 communicates with an ink outlet 130. Each ink outlet 130 is in the form of a rupturable seal.

As shown in greater detail in FIG. 5 of the drawings, the ink supply manifold 56 of the printer 10 includes pins 132. These pins 132 communicate with the ink supply hoses 52. When the cartridge 22 is inserted into the printer 10, and the cartridge 22 is driven home by the gear train 44, the pins 132 pierce the seals 130 to place the hoses 52 in communication with their associated ink supply channels 126.

The cartridge 22 includes a quality assurance chip 134. This chip 134 ensures correct communications between the cartridge 22 and the printer 10 and that the cartridge 22 is of the required quality. The chip 134 communicates with the printer 10 via chip contacts 136 mounted on the ink supply manifold 56 of the printer 10. Thus, when the cartridge 22 is driven home by the gear train 44, the chip 134 engages the contacts 136 for enabling communications to be established between the chip 134 and the circuit board 36 of the printer 10.

Figure 17:
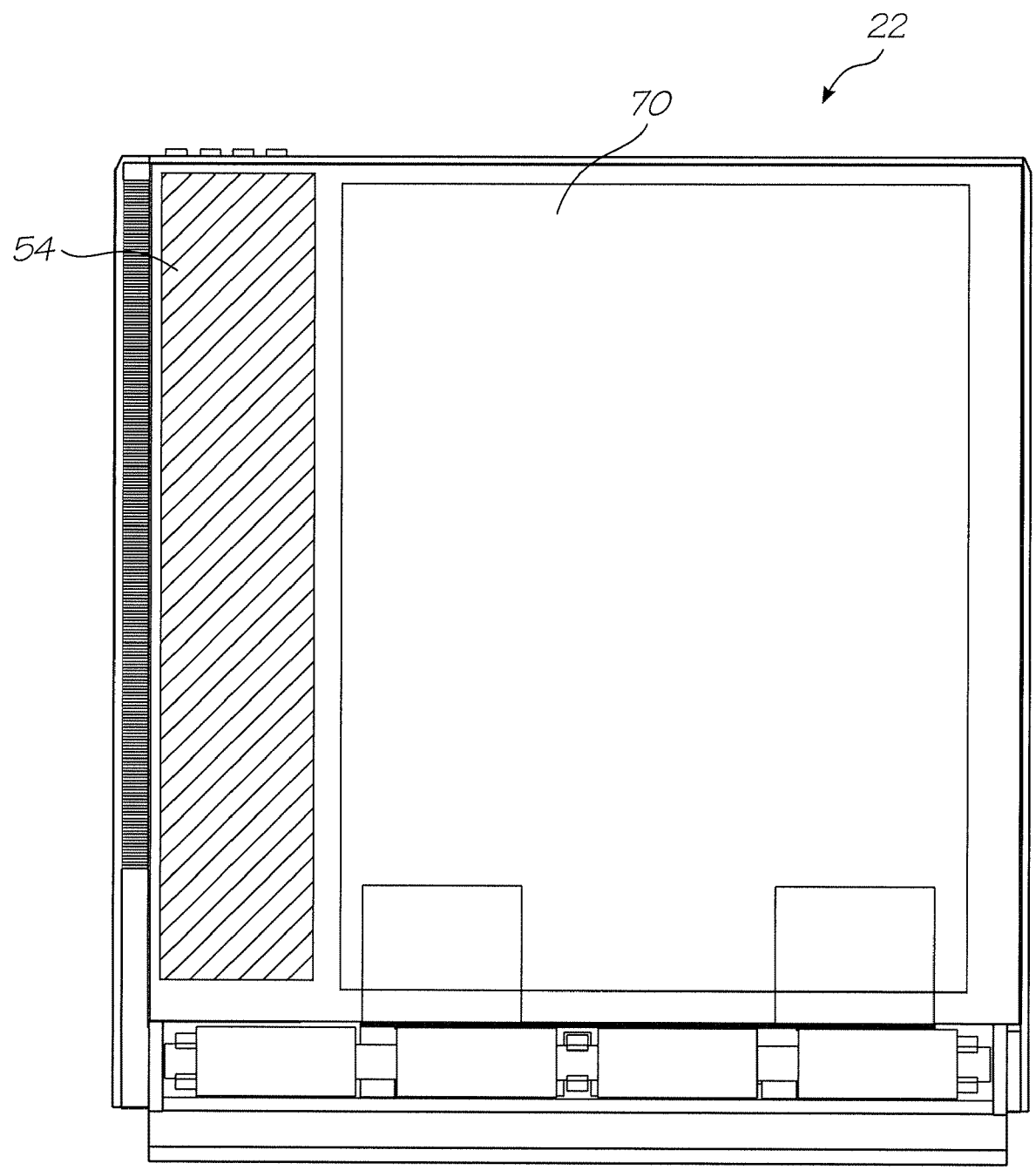
FIG. 17 shows a schematic, plan view of one embodiment of the cartridge.

FIG. 17 shows a first embodiment of the cartridge 22 with the ink supply reservoir 54 arranged on a left side of the cartridge 22 and the stack 70 arranged on the right side of the cartridge 22.

Figure 18:
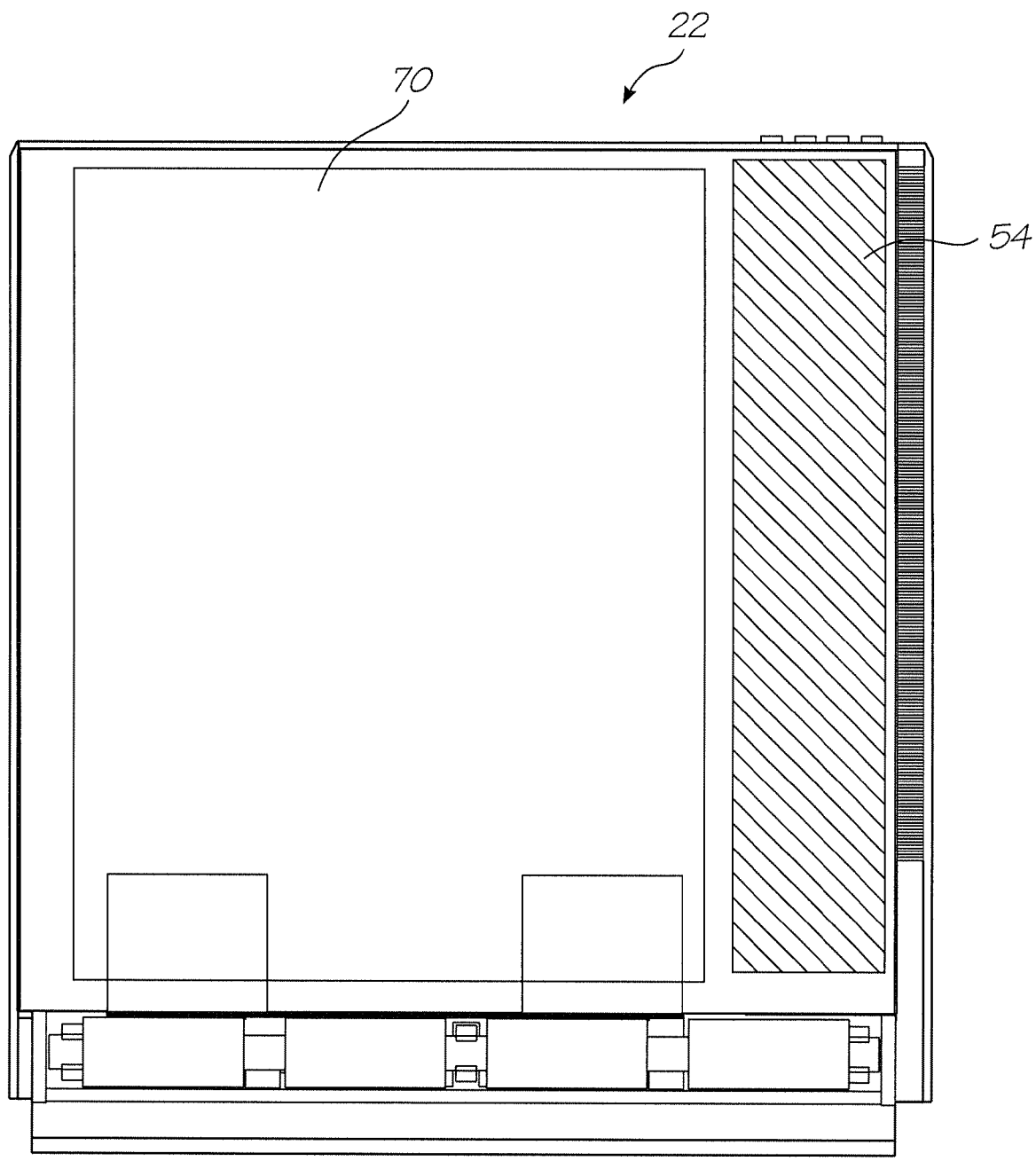
FIG. 18 shows a schematic, plan view of another embodiment of the cartridge.

FIG. 18 shows another embodiment of the cartridge 22 with the stack 70 arranged on the left side of the cartridge 22 and the ink supply reservoir 54 being arranged on the right side of the cartridge 22.

Figure 19:
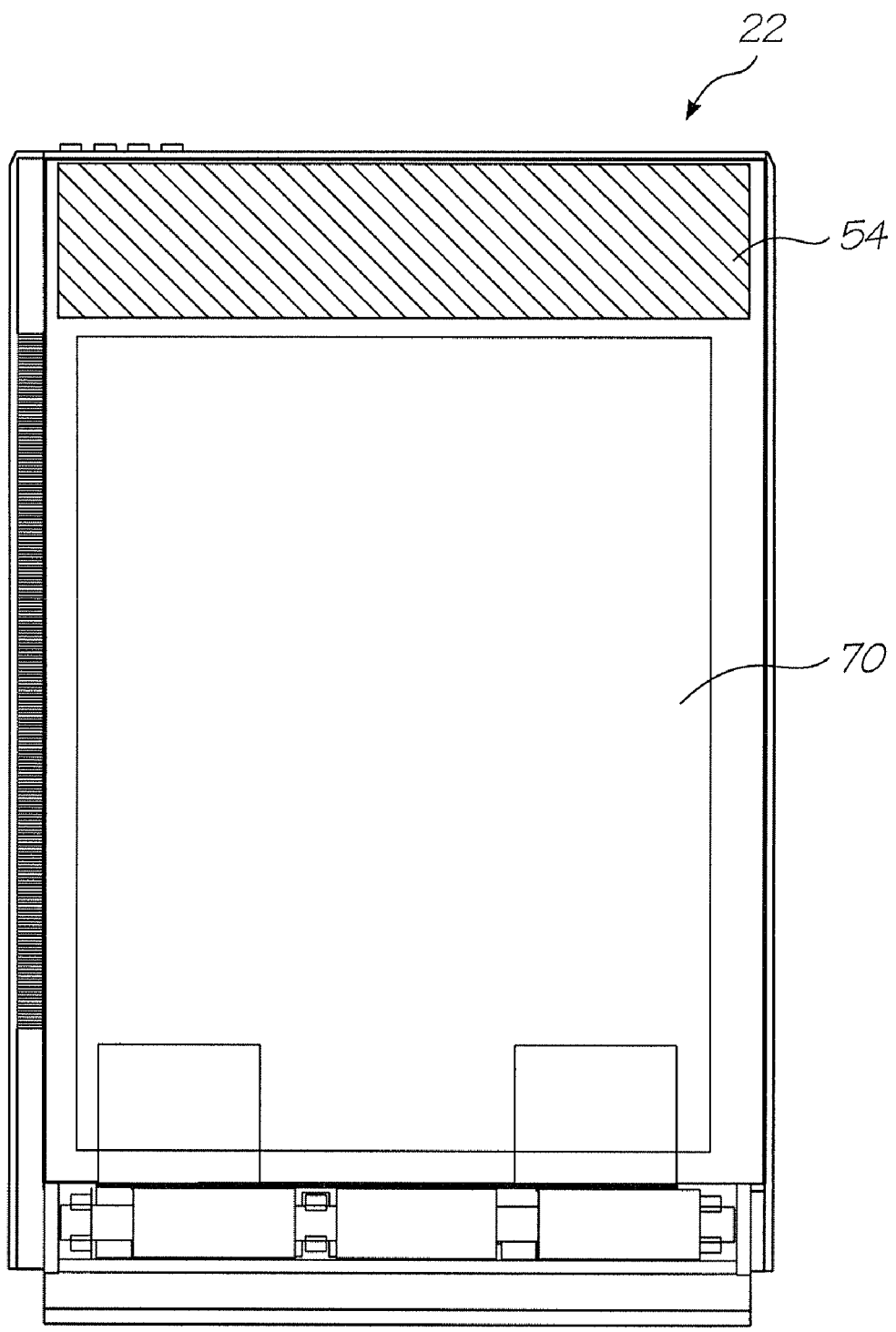
FIG. 19 shows a schematic, plan view of a further embodiment of the cartridge.

FIG. 19 shows yet a further embodiment with the stack 70 arranged at a front of the cartridge 22 with the ink supply reservoir 54 being arranged at a rear of the cartridge 22.

Figure 20:
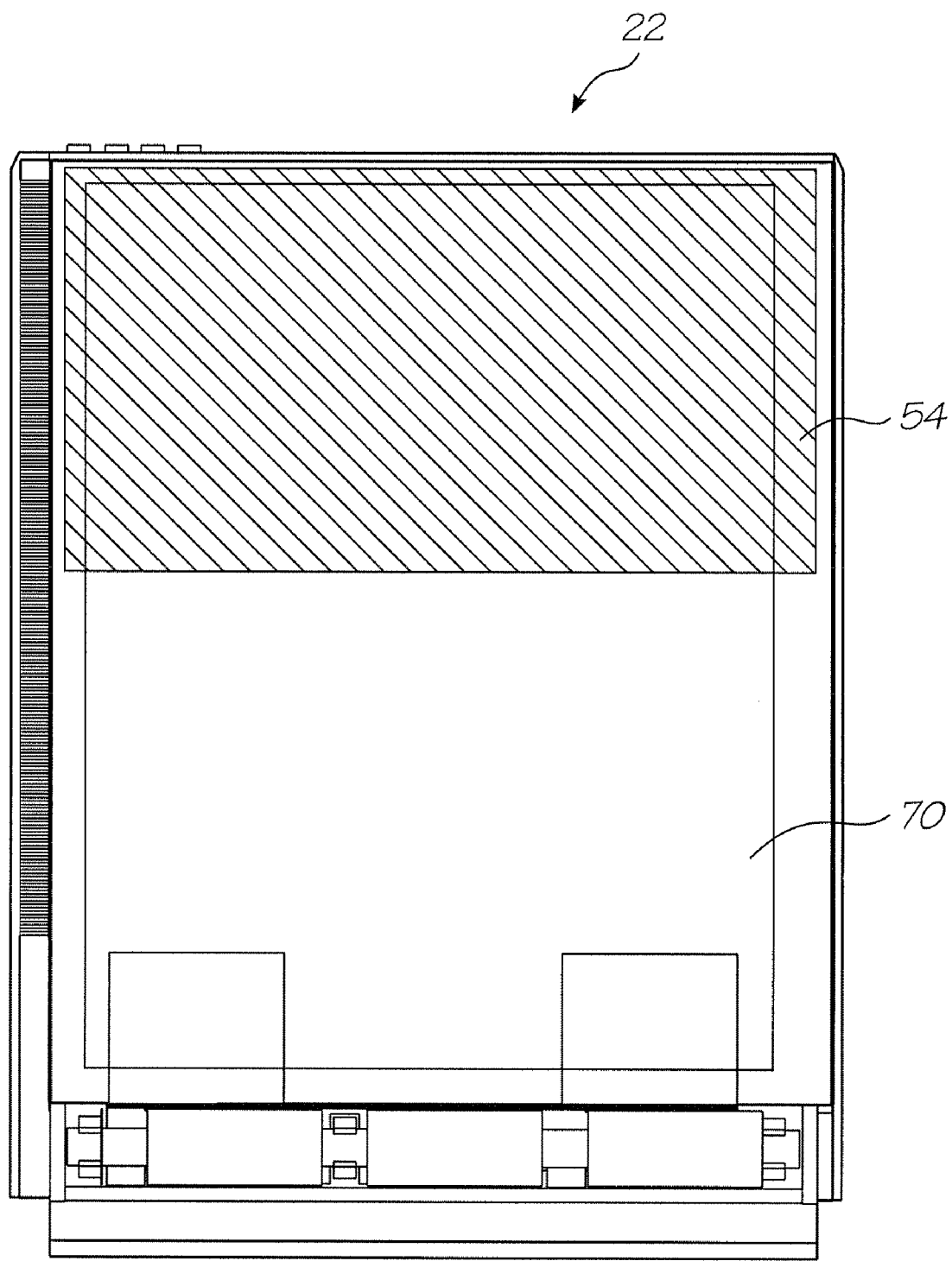
FIG. 20 shows a schematic, plan view of yet a further embodiment of the cartridge.

FIG. 20 shows yet a further embodiment with the stack 70 arranged on the platen 118 with the ink supply reservoir 54 being arranged below the platen 118. It will be appreciated also, with reference to this embodiment that the ink supply reservoir 54 could be arranged above the stack of paper 70 although this will increase the height of the cartridge 22 and, accordingly, the height of the printer 10.

The cartridge 22 is a disposable unit so that, once its ink supply and paper supply have been depleted, the cartridge is disposed of. Instead, the cartridge 22 may be re-useable. In the latter case, once the supply of ink and paper in the cartridge 22 have been depleted and the cartridge 22 is ejected from the printer 10, the used, empty cartridge 22 can be taken by a user to a supplier for a refund. It is to be noted that the cartridge 22 is automatically ejected from the printer 10 once its supply of paper and/or ink has been depleted.

Figure 21:
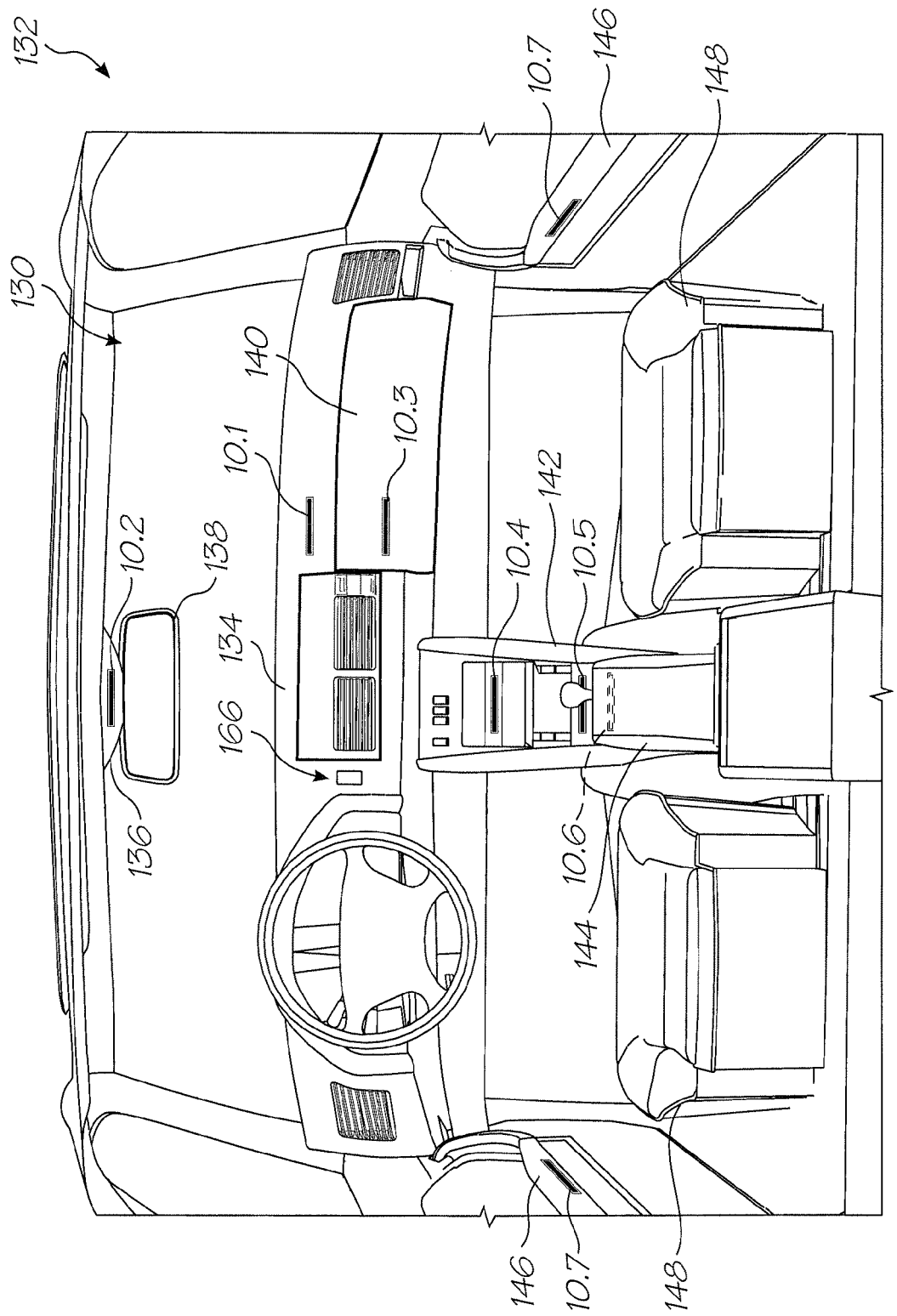
FIG. 21 shows a schematic representation of an interior compartment of a vehicle indicating various locations for the printer of FIGS. 1 to 10.

As described above, the printer 10 is intended particularly for use in a motor vehicle. The printer 10 is dimensioned to fit in numerous positions in a passenger compartment 130 (FIG. 21) of a motor vehicle 132. The printer 10 is, desirably, mounted where it is readily accessible within the passenger compartment 130 of the vehicle 132.

Various desirable locations within the passenger compartment 130 are now described. Firstly, a printer, designated by the reference numeral 10.1, can be mounted in a dashboard 134 of the vehicle 132. This provides a good location at least for front occupants of the passenger compartment 130 and, usually, this part of the dashboard 134 of the vehicle 132 is unoccupied by other equipment.

A second desirable location is in an overhead fitting 136 arranged above a rear view mirror 138 of the passenger compartment 130. Thus, a printer 10.2 can be mounted in this fitting 136. Once again, this provides good access, at least for front occupants of the passenger compartment.

Another location in the passenger compartment for a printer 10.3 is a glovebox 140. This is a convenient location in that the printer 10.3 can be built into the lid 140 of the glovebox. This renders the printer 10.3 readily accessible for servicing purposes.

Yet a further location is in an upper region of a console 142 as illustrated by printer 10.4. Another suitable location for a printer 10.5 is in a lower region of the console 142 where, for example, coin trays or the like are sometimes mounted. A further suitable location is in a central armrest 144 of the passenger compartment 130 in which a printer 10.6 could be installed. Still further, if there is sufficient space, printers 10.7 could be built into door arm rests 146 of the passenger compartment. Only the person adjacent such a door armrest will have easy access to the printer 10.7 but this need not necessarily be a major inconvenience.

It will also be appreciated that more than one printer could be provided in the passenger compartment. Although not shown, printers could also be provided in back rests of the front seats of the passenger compartment 130.

Those skilled in the art will appreciate that the exemplified locations as described above are not the only locations in which printers 10 could be installed and it is conceivable that printers could be stored in less convenient location such as in footwells of the passenger compartment 130, under the front seats, in an arm rest of a rear seat of the passenger compartment 130, or the like.

Also, it is envisaged that receiving sockets for printers could be molded into relevant fittings in the passenger compartment 130 during manufacture of the vehicle 132. The receiving sockets could include wiring for the printer 10. The receiving sockets could then be closed off by blanking plates, the relevant blanking plate being removed to facilitate installation of the printer 10.

In another embodiment of the invention, the printers 10 are built into and form part of car audio devices, which are also referred to as in car entertainment (ICE) units.

Figure 22:
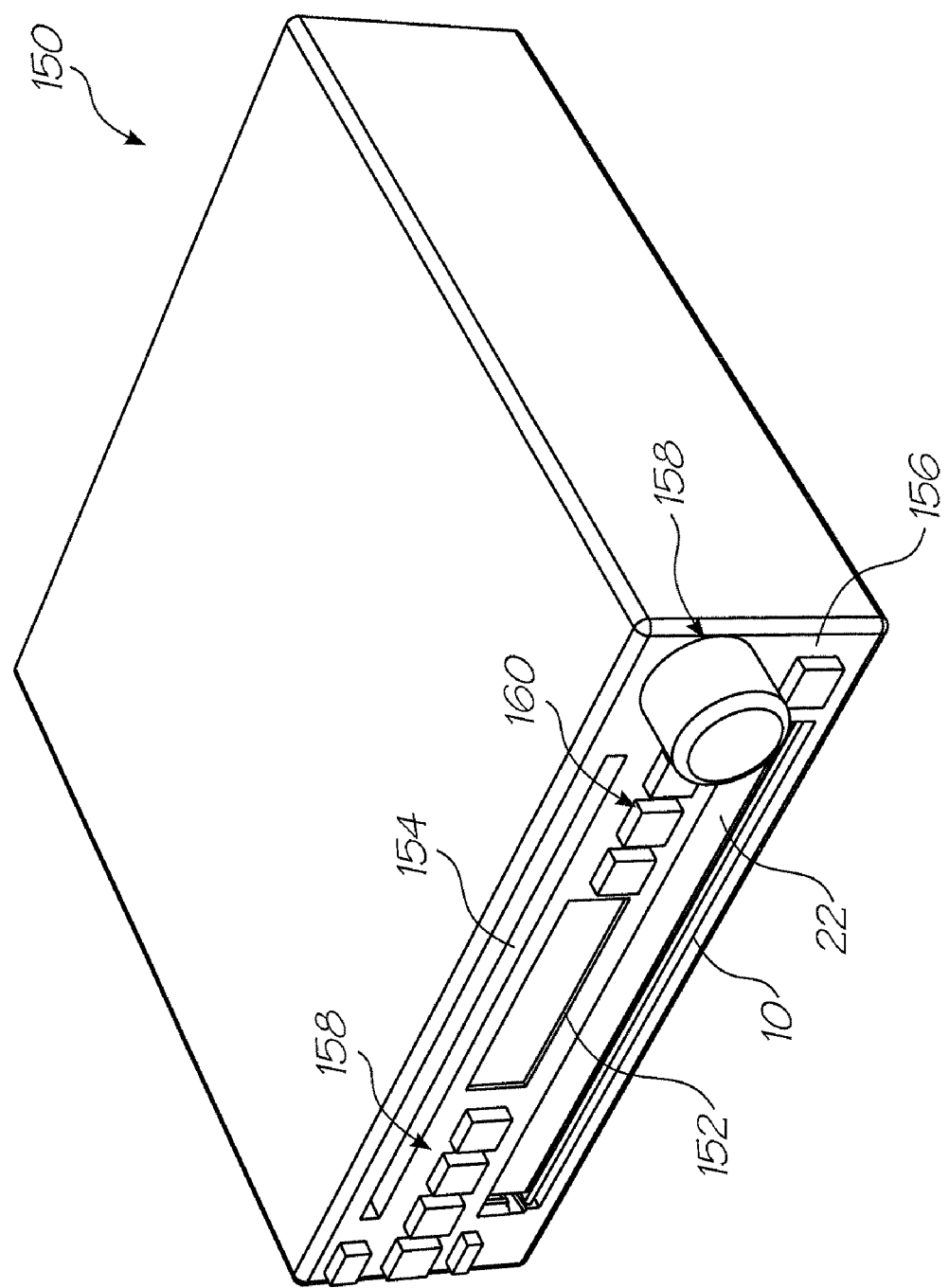
FIG. 22 shows a three dimensional view of a vehicle audio unit incorporating a printer, in accordance with the invention.

Accordingly, as shown in FIG. 22 of the drawings, an ICE unit 150 is illustrated. The ICE unit 150 incorporates a radio having an LCD display 152, a CD player having a slot 154 in a front panel of the unit 150 and various controls 158.

The ICE unit 150 includes a printer 10 as described above including the cartridge 22. The ICE unit 150 includes controls 160 for controlling printing from the printer 10. The controls 160 are used for instructing the printer 10 to print required information. Depending on the material to be printed, the LCD 152 can be used for previewing material to be printed.

It is envisaged that this embodiment of the invention will be used for printing information from radio broadcasts, CD's played in the CD player 150, or the like.

Figure 23:
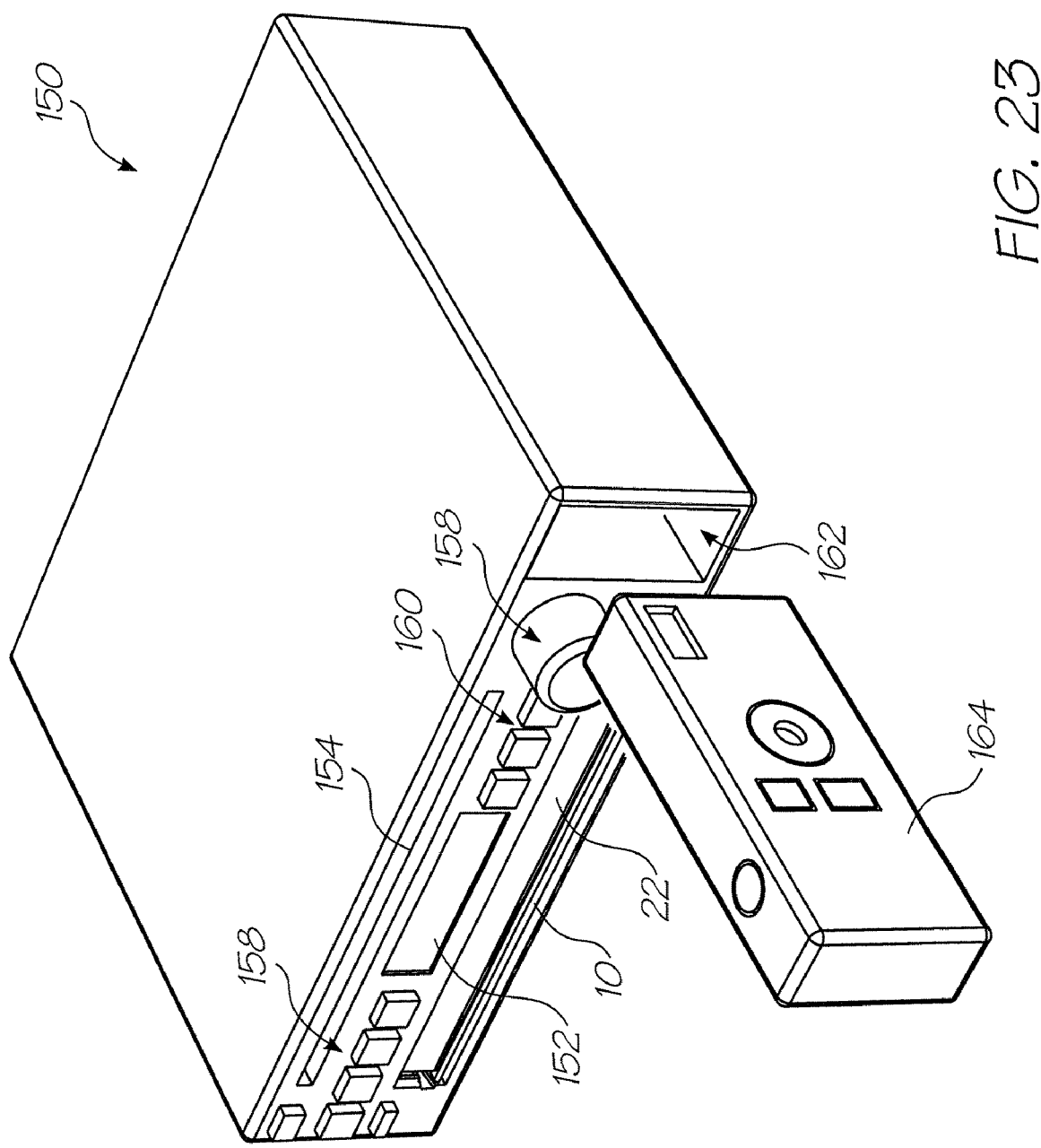
FIG. 23 shows a three dimensional view of a further vehicle audio unit incorporating a printer and other devices.

Referring now FIG. 23 of the drawings a variation of the ICE unit 150 illustrated in FIG. 22 is illustrated. With reference to FIG. 22, like reference numerals refer to like parts, unless otherwise specified.

In this embodiment of the invention, the ICE unit 150 includes a slot 162 in which a digital camera 164 is received. The digital camera 164 and the slot 162 have corresponding electrical contacts so that information can be downloaded from the camera 164 to be printed via the printer 10. Accordingly, it is an advantage of this embodiment of the invention that information from a digital camera can be downloaded as soon as a user of the camera has used the camera and/or has returned to the vehicle 132. Thus, the user need not, unlike at present, await the user's return to a venue where the camera can communicate with a computer for downloading information captured by the camera 164.

It is also contemplated that a suitable slot 162 could be incorporated in, for example, the dashboard 134 of the vehicle 132 as illustrated at 166 so that a camera can be incorporated in the vehicle 132 for printing on any one of the printers 10.1 to 10.7. In other words, the slot 166 need not form part of an ICE unit but may be provided as a separate feature in the vehicle 132 in association with one of the printers 10.1 to 10.7.

Referring now to FIGS. 24 and 25 of the drawings, a further ICE unit 170 is provided. In this embodiment, the ICE unit 170, in addition to a CD player 172 and a radio having controls 174, includes a full color LCD 176. The ICE unit 170 further functions as a satellite navigation unit and may also be used for receiving television signals. The unit 170 incorporates a printer 10 of the type described above. The unit 170 includes controls 178. These controls 178 are GPS controls and are used for satellite navigation purposes. In addition, a further bank of controls 180 is provided for controlling the printer 10.

With this unit 170, a map, or the like, can be downloaded and printed via the printer 10 or images from the LCD 176 when it is used as a television receiver can be printed via the printer 10.

The unit 170 shown in FIG. 25 of the drawings, once again, incorporates a slot 182 for receiving a digital camera 184. The slot 182 and the digital camera 184 therefore have corresponding electrical contacts for enabling data to be downloaded from the digital camera 184 to be printed on the printer 10.

Accordingly, it is an advantage of the invention that an in-vehicle printer 10 is provided for enabling suitable materials to be downloaded and printed rapidly. Further, the fact that the printhead 34 of the printer 10 uses a pagewidth, full color printhead means that high quality images can be printed using the printer 10. It will also be appreciated that, due to the fact that the printhead 34 is a pagewidth printhead and does not traverse the media on which an image is being printed, it is less susceptible to jolting, bumping or other such disturbances. In other words, it is less likely to produce a poor quality image even if printing is taking place while the vehicle is moving.

Although the invention has been described with reference to a number or specific embodiments, it will be appreciated by those skilled in the art that the invention can be embodied in many other forms.

We claim:

1. An in-car entertainment unit for operative mounting in a cockpit of a motor vehicle, the unit comprising:

a printer having a pagewidth printhead, an ink and media cartridge, and a feed system for feeding the media past the printhead, the printer being configured to be mounted in the cockpit in connection with a power supply of the motor vehicle, wherein the feed system includes a pick-up roller for engaging a sheet of media, a first motor, and a first gear train for coupling the motor to the pick-up roller, wherein the cartridge includes two first racks for engaging corresponding cogs mounted to an axle of the unit to thereby prevent skewing of the cartridge as it is inserted into and removed from the unit, the cartridge further including a second rack for engaging the first gear train such that operation of the gear train can be used to feed the cartridge into the unit;

an electrical connecting arrangement in a slot defined by the printer for operatively receiving a digital camera so that information is downloadable from the camera for printing via the printer; and a display for previewing the information prior to printing.

2. The unit as claimed in claim 1, which includes controls for controlling printing from the printer.

3. The unit as claimed in claim 1, which includes a radio for receiving radio broadcasts with the printer configured to print information from the radio broadcasts.

4. The unit as claimed in claim 1, which includes a compact disk (CD) player, the printer being configured to print information from the CD player.

5. The unit as claimed in claim 1, which includes a satellite navigation unit, the printer configured to print information from said satellite navigation unit.

6. The unit as claimed in claim 1, which includes a television receiver for receiving television signals, the printer configured to print information from the television receiver.

* * * * *